(12) United States Patent  
Obara et al.

(10) Patent No.: US 6,966,001 B2  
(45) Date of Patent: Nov. 15, 2005

(54) COMPUTING SYSTEM AND DATA DECRYPTION METHOD AND COMPUTER SYSTEM WITH REMOTE COPY FACILITY

(75) Inventors: Kiyohiro Obara, Hachioji (JP); Hisashi Takamatsu, Odawara (JP); Masafumi Nozawa, Odawara (JP); Takashi Oeda, Sagamihara (JP); Noboru Morishita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 719 days.

(21) Appl. No.: 09/810,575

(22) Filed: Mar. 19, 2001

(65) Prior Publication Data

US 2003/0037247 A1 Feb. 20, 2003

(30) Foreign Application Priority Data

May 23, 2000 (JP) .......................... 2000-155954
Sep. 7, 2000 (JP) .......................... 2000-271865

(51) Int. Cl.⁷ .............................................. H04L 9/00
(52) U.S. Cl. .................. 713/200; 713/201; 713/193
(58) Field of Search ............... 713/201, 193, 713/200, 176, 1; 707/202, 204; 711/161, 162; 714/4, 13, 47; 340/3.3; 395/182.04

(56) References Cited

U.S. PATENT DOCUMENTS 5,909,700 A 6/1999 Bitner et al.
6,044,155 A 3/2000 Thomlinson et al.
6,049,874 A * 4/2000 McClain et al. ............. 713/176
6,397,307 B2 * 5/2002 Ohran ......................... 711/161
6,496,949 B1 * 12/2002 Kanevsky et al. ............. 714/47
6,615,225 B1 * 9/2003 Cannon et al. ............. 707/204
6,754,827 B1 * 6/2004 Cane et al. .................. 713/193

FOREIGN PATENT DOCUMENTS

| EP | 1079581 | 2/2001 |
| JP | 9139735 | 5/1997 |
| WO | 9835472 | 8/1998 |

OTHER PUBLICATIONS

"New products: General–Purpose Parallel Processor and Disk Array", Nikkei watcher IBM version, Special Issue, ISBN 4–8222–1558–X, published by Nikkei Business Publications, Inc., Nov. 13, 1995, pp. 256–291.
D. Boneh, "A Revocable Backup System", Supported in part by NSF CCR–9304718, pp. 91–96.

\* cited by examiner

Primary Examiner—Gregory Morse
Assistant Examiner—Ellen C Tran
(74) Attorney, Agent, or Firm—Mattingly, Stanger, Malur & Brundidge, P.C.

(57) ABSTRACT

A computing system and encryption/decryption method realizes assurance of security and improvement of throughput in a remote system. For this purpose, encrypted data is written to a storage system, it is determined whether data in the storage system is ciphertext or plaintext, and encrypted data is read, decrypted and re-written in storage asyncronously with writing encrypted data to storage.

15 Claims, 20 Drawing Sheets

FIG. 11

| LUN NUMBER 35 | LOGICAL BLOCK-ADDRESS 36 | WRITE DATA LENGTH 37 |
|---|---|---|
| 0 | 10 | 100 |
| 5 | 123 | 789 |
| ~ | ~ | ~ |
| 1 | 94 | 20 |
| −1 | | |

COMPUTING SYSTEM AND DATA DECRYPTION METHOD AND COMPUTER SYSTEM WITH REMOTE COPY FACILITY

BACKGROUND OF THE INVENTION

A data backup technique is an important means for protection and recovery of data when a failure occurs in a computing system. The backup technique actually implemented at each operating center is selected on the basis of several parameters, such as the extent of failure that can be handled, the discrepancy of data with the backup site, the interruption of applied work, and the amount of delay in the response time of the storage system.

Among these backup techniques, there is a backup technique called remote copy. This is a backup technique in which a storage system itself copies information having received write requests to another storage system. Here, the system as a source of copying is called the local system, and the system as a destination of copying is called the remote system. As an example of remote copy, the SYMMETRIX remote data function is explained in "New products: General-Purpose Parallel Processor and Disk Array", Nikkei Watcher IBM version, Special Issue, ISBN 4-8222-1558-X, published by Nikkei Business Publications, Inc., Nov. 13, 1995, pp. 256–291.

Here, the path connecting the local system and the remote system can be a storage interface, such as ESCON (Enterprise System Connection) in the case of short distance transmission, but in the case of long distance transmission, it goes by way of a circuit using a director or switch. In the case of going through such a circuit, especially with a public circuit, encryption of remote copy data is frequently used as a countermeasure against unauthorized receipt of data. Such encryption and decryption is performed by the storage system itself, or by a director or switch, or the like.

SUMMARY OF THE INVENTION

The present invention relates to data maintenance in an information processing system by remote copy (also called remote data backup). In particular, it relates to a data encryption and decryption method employed between a local system and a remote system, as well as a system for realizing it.

The present invention relates to external storage devices that store computer system data, as well as a system integrating them; and, in particular, it relates to technique that encrypts and transfers data in remote copy technology that interconnects a plurality of external storage devices (subsystem group) and another plurality of external storage devices (subsystem group) being present at a remote location, and replicates data within the external storage devices (subsystem group) present at the remote location.

Data encryption/decryption is a time-consuming process. Therefore, processing of decrypting data can produce a bottleneck in a system that simultaneously receives multiple encrypted data from a plurality of systems, such as corporate backup centers and data centers. Because of this, the quantity of data that can be received simultaneously becomes smaller, and the data backup capacity of the corporation and the data processing capacity of the data center have become limited.

When considering data backup in the event of a natural disaster, such as an earthquake, it is necessary that the main center and the remote center in a center consisting of a host computer (upper layer device) and a subsystem, and the like, be as much as several 100 km apart. Here, a subsystem means a controller that performs sending and receiving of information with the upper layer device, and a storage device which contains a disk device, and the like, that performs storage of information (called a disk subsystem when the storage device is a disk device). For this, there have already been put into practice some external storage systems utilizing so-called remote copy functions which replicate and maintain data between subsystems established respectively at a main center and a remote center.

Remote copy functions are largely divided into two types, synchronous and asynchronous. The synchronous type involves a processing procedure whereby, when there is a data update (write) instruction from the host computer (upper layer device) within the main center to the subsystem within the main center, and also when the object of that instruction is the object of the remote copy function, after the instructed update (writing) is finished with respect to the subsystem at the remote center as an object of that remote copy function, the completion of the update processing is reported to the upper layer device at the main center. In this case, a time delay (transmission time, and the like) arises due to the influence of the capability of the data transmission path between the main center and the remote center according to the geographical distance between them.

As opposed to this, the asynchronous type involves a processing procedure whereby, when there is a data update (write) instruction to the subsystem from the upper layer device within the main center, even when the object of that instruction is the object of the remote copy function, as soon as the update processing of the subsystem within the main center is finished, the completion of the update processing is reported to the upper layer device, and updating (reflection) of the data in the subsystem at the remote center is executed asynchronously with the processing at the main center. Therefore, because the data update is completed within the necessary processing time internal to the main center, the transmission time, and the like, due to storage of data to the remote center, doesn't arise.

With the asynchronous type, the contents of the subsystem at the remote center do not always match those on the side of the main center. Therefore, when the main center has lost functionality due to a disaster, and the like, the data of which the data reflection on the side of the remote center is incomplete becomes lost. However, the performance of access to the subsystem on the main center side can be treated as an equivalent level to when the remote copy function is not implemented.

In order to realize these remote copy functions with high performance and at low cost between distant places, the asynchronous type is used. In this case, because a public communication circuit is used as the transmission path for transferring (copying) data from the main side to the remote side, as will be described below, protection against unauthorized receipt of information becomes an important issue.

On Transfer of Encrypted Data

When data transfer over a public communication circuit is performed, encrypted data transfer is performed for protection against the unauthorized receipt of information, and application of this feature to remote copy is considered. In this case, encrypted data transfer is performed between the primary disk subsystem group of the main center and the secondary disk subsystem group of the remote center. In remote copy, because data transfers are performed over long period of time, high data transfer performance and high cryptographic strength must be simultaneously established.

On Transfer of Encrypted Data over a Communication Channel

In a data communication system comprising two or more computers that communicate data over a network, there is a method in which an application program of one computer encrypts and transmits data to an application program of another computer. A substantial disclosure of this method is detailed, for example, in Japanese Unexamined Patent Gazette H9-139735, "Encrypted Data Communication System." In said "Encrypted Data Communication System," encrypted data transfer over a communication channel is realized by running a relay service program on each of two computers, encrypting data with these relay services, and sending and receiving the data over a network.

By the prior art (Encrypted Data Communication System), the function of encrypted data transfer over a communication channel can be realized. However, with the prior art, when data transfers are performed over a long time, because the same cryptographic key is used for a long time without being updated, there is a risk that the cryptographic key may be maliciously deciphered and data may be stolen. Also, even if the cryptographic key is updated, because it is communicated offline, the data transfer performance is reduced. That is, with the prior art, simultaneous establishment of high data transfer performance and high cryptographic strength is not considered.

The first object of the present invention is to provide a remote system that receives encrypted data by remote copy, and the like, using a means that receives a large amount of encrypted data at the same time.

The second object of the present invention is to realize a remote copy function that simultaneously establishes high data transfer performance and high cryptographic strength.

The above objects are achieved by a means that writes encrypted data to a storage system, a means that identifies whether or not data in the storage system is ciphertext or plaintext, and a means that reads, decrypts, and rewrites encrypted data in storage asynchronously with the writing of encrypted data to storage.

In order to solve the aforementioned problems, the present invention mainly adopts the following configuration.

A computer system with remote copy facility has a main center consisting of a primary disk subsystem group having a control means that is connected to an upper layer device and performs sending and receiving of data and a storage means that performs storage of said data; and a remote center consisting of a secondary disk subsystem group having a control means that is disposed in a place located at a distance from said primary disk subsystem group and receives encrypted data transferred from said primary disk subsystem group and a storage means that performs storage of said transferred data, wherein said primary disk subsystem group updates the cryptographic key at a specified interval or an irregular interval, and also interrupts said data transfer to said secondary disk subsystem group and transfers the updated cryptographic key to said secondary disk subsystem group.

Also, a computer system with remote copy facility has a main center consisting of a primary disk subsystem group having a control means that is connected to an upper layer device and performs sending and receiving of data and a storage means that performs storage of said data; and a remote center consisting of a secondary disk subsystem group having a control means that is disposed in a place located at a distance from said primary disk subsystem group and receives encrypted data transferred from said primary disk subsystem group and a storage means that performs storage of said transferred data, wherein said primary disk subsystem group during execution of data write processing determines whether or not it is time for updating the cryptographic key for encrypted data transfer, and if it is time for updating, updates said cryptographic key, and also transfers it to said secondary subsystem assigning a sequence number to said updated cryptographic key, and associates it with transferred data assigned with the sequence number.

Also, in a remote copy method of a storage system constituted by a local storage system that stores data written from an upper layer device and a remote storage system that stores a copy of said data, said local storage system encrypts said data with a cryptographic key; said encrypted data is transferred from said local storage system to said remote storage system; said cryptographic key is iteratively updated; and said updated cryptographic key is transferred from said local storage system to said remote storage system, wherein said encryption step uses the updated cryptographic key after said cryptographic key was updated.

BRIEF DESCRIPTION OF THE DRAWINGS

FIG. 11 is a chart showing one example of the structure of an encryption table.

DESCRIPTION OF THE PREFERRED EMBODIMENTS

Next, the first preferred embodiment of the present invention will be explained with reference to FIG. 1 to FIG. 14. First an explanation will be given of the existing remote copy method, which is the main application of the present invention, and then the preferred embodiments of the present invention will be explained.

Figure 2:
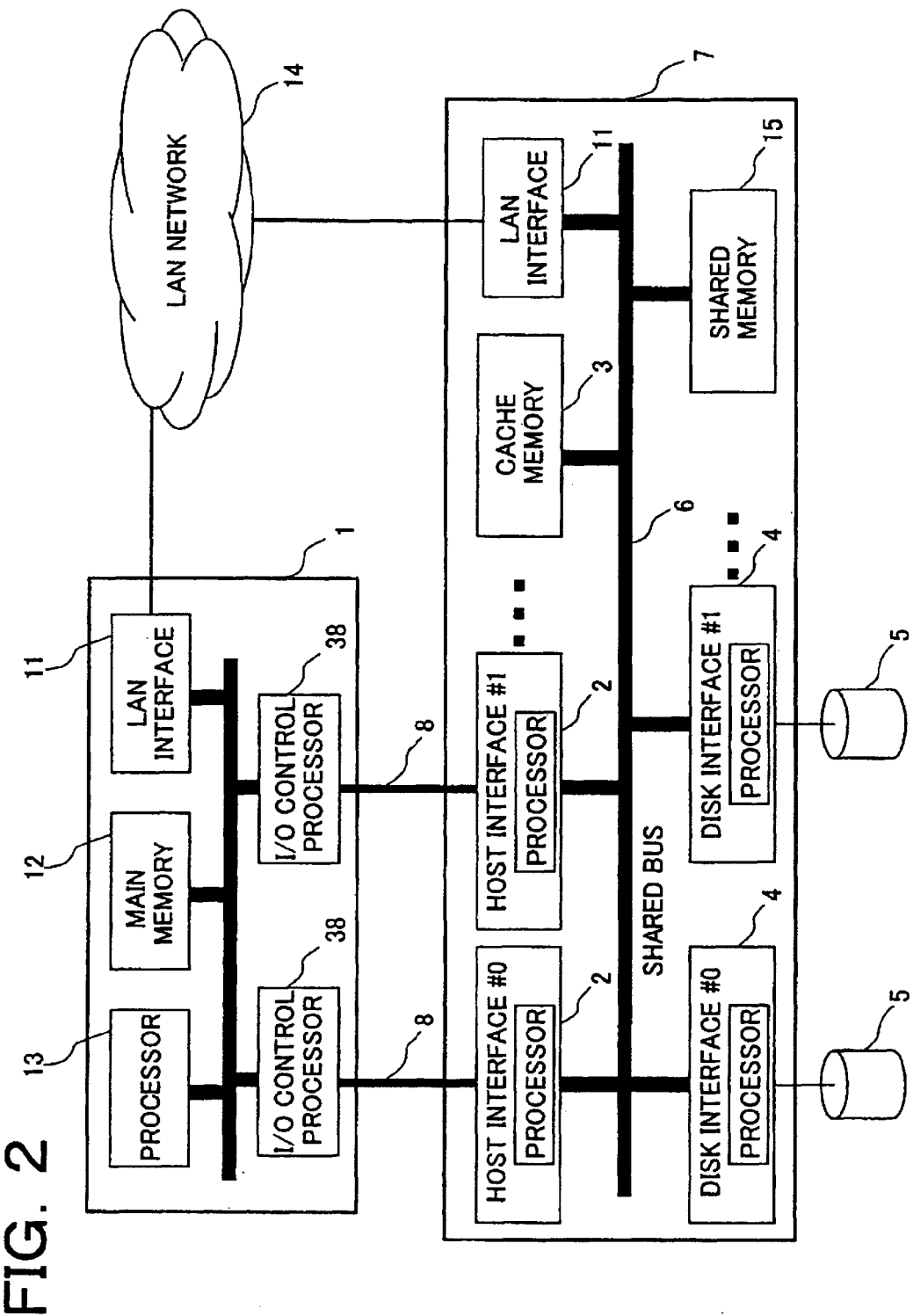
FIG. 2 is a block diagram showing one example of the configuration of a single disk control unit.

FIG. 2 shows one example of the configuration of a single disk control unit. Disk control unit 7 is connected to host computer 1 by a host interface 2 and a channel path 8, and it is constituted by a cache memory 3, a shared memory 15, a disk interface 4 connected to a disk drive unit 5, and common bus 6 connecting these elements. A plurality of disk interfaces can be installed. A plurality of host interfaces 2 also can be installed, and this case does not depend upon whether or not host 1 as a connection destination is the same. FIG. 2 of the present preferred embodiment shows an example where each host interface is connected to the same host.

Host interface 2 and disk interface 4 are equipped with processors, and they operate independently of each other. Also, cache memory 3, shared memory 15, and LAN interface 11 are shared resources that can be referenced from a plurality of host interfaces 2 and a plurality of disk interfaces 4. In cache memory 3, data written to this disk control unit and data read from disk drive unit 5 and output to the host are temporarily stored.

When the disk control unit has a disk array function, data sent from the host is divided and is stored so as to be distributed across a plurality of disk drive units 5. The present preferred embodiment can be applied also to a disk array, but for the sake of simplicity of explanation, the following explanation is presented as an example of the operation with an ordinary disk drive unit.

Host computer 1 has processor 13, main memory 12, and I/O control processor 38. I/O control processor 38 performs input and output operations with disk control unit 7. Based on instructions from processor 13, in the case of a read operation, a read command for the specified disk drive (volume) is generated and transmitted to disk control unit 7, and data from disk control unit 7 is received and stored in main memory 12. In the case of a write operation, a write command for the specified disk drive (volume) is generated, and it is transmitted to disk control unit 7 together with write data.

Figure 3:
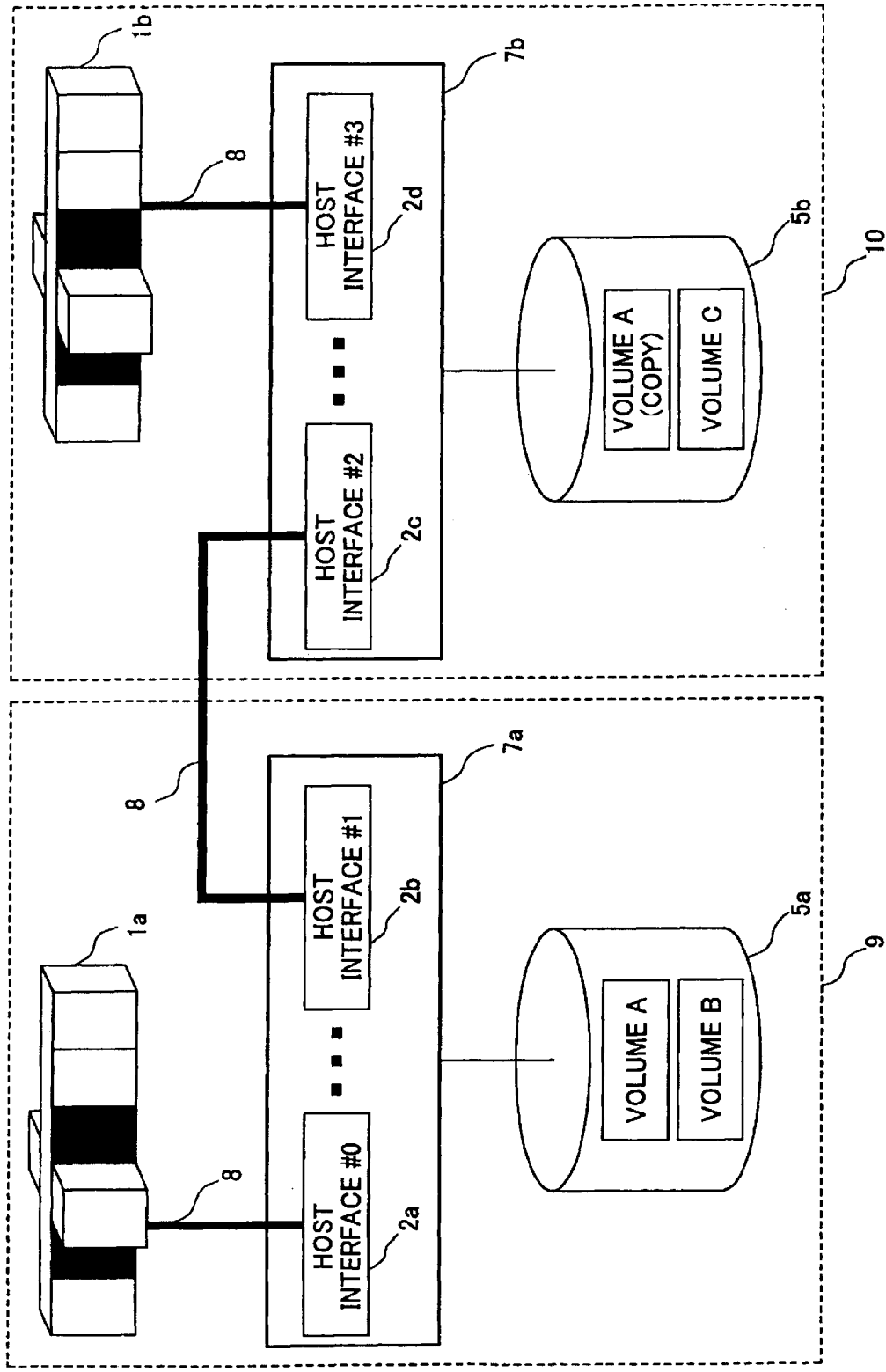
FIG. 3 is a block diagram showing one example of the configuration of a remote copy system.

One example of the configuration of a remote copying system is shown in FIG. 3. Remote copying is a function whereby a disk control unit autonomously copies a specified volume to another disk control unit. This function is realized by a program on a host interface.

Here, volume A in disk drive unit 5a of local system 9 is copied into disk drive unit 5b of remote system 10. In FIG. 3, the local system and the remote system appear to have the same configuration, but in remote copying, it is not necessary that the local system and the remote system have systems of the same configuration, including the running software. Furthermore, they are called local system/remote system for convenience here, but it is not necessary that one be a standby system to the other. For example, the local system may be a main task system, and the remote system may be a data warehouse system. Also in FIG. 3, it is assumed that volumes other than volume A are volumes with different contents used by different applications.

The operation of remote copying is as follows. First, for a write request command to a disk from host 1a, host interface #0 (2a) determines whether or not the volume to the destination of writing is the object of remote copying. Information on the volume as an object of remote copying is placed in shared memory, and the processor on host interface #0 (2a) determines this by referencing the shared memory. When it is not the object of remote copying, the write request command is processed as is.

When the destination of writing is the object of remote copying, the write request command is processed as usual, and in addition, the same write request command as the command received from the host is issued to disk control unit 7b, using host interface #1 (2b) connected to disk control unit 7b of remote system 10. In this way, a copy of volume A is generated on disk drive unit 5b of remote system 10. These host interfaces 2 have the functions both of issuing processing and receiving processing of input/output commands. The processing/generation functions of these commands are realized by the processing of a processor in host interface 2.

The start/finish, and the like, of remote copying are controlled from a program on the host using the same commands as ordinary input/output commands. The main commands will be described next.

(1) Initialization & Copy Start command (Copies the entire contents of the specified volume to the destination of copying in order to make the contents of the destination of copying the same as the source of copying (initialize), and also starts remote copying in the specified copy mode (synchronous/asynchronous) for a write request command issued from the host.)

(2) Interrupt command (Temporarily interrupts the remote copy. Remote copy data with respect to write request commands received after this are held in a buffer, and are provided to a later restart command.)

(3) Restart command (Restarts interrupted remote copying. Also performs copying of remote copy data held in the buffer.

(4) Flush command (Forcefully copies remote copy data held in the buffer to the destination of copying.)

In FIG. 3, the local system and the remote system are connected by the same type of path as the channel path connecting the host computer and the storage system. However, the physical/electrical specifications of a general channel path assume a connection across a comparatively short distance.

For example, with disk and peripheral device interfaces known as SCSI-2 (Small Computer System Interface—2) standard (ANSI X3.131-1994), the connection distance is a maximum of 25 m. With interfaces using optical connections, the fiber channel standard (ANSI X3.230-1994) adopts a maximum of 10 km. The ESCON standard adopts a maximum of 60 km. Accordingly, such a channel path is not applicable to a method of connecting local-remote systems over long distances, for example, Tokyo-Osaka, in remote copying performed for the purpose of a measure for disaster, and the like.

Figure 4:
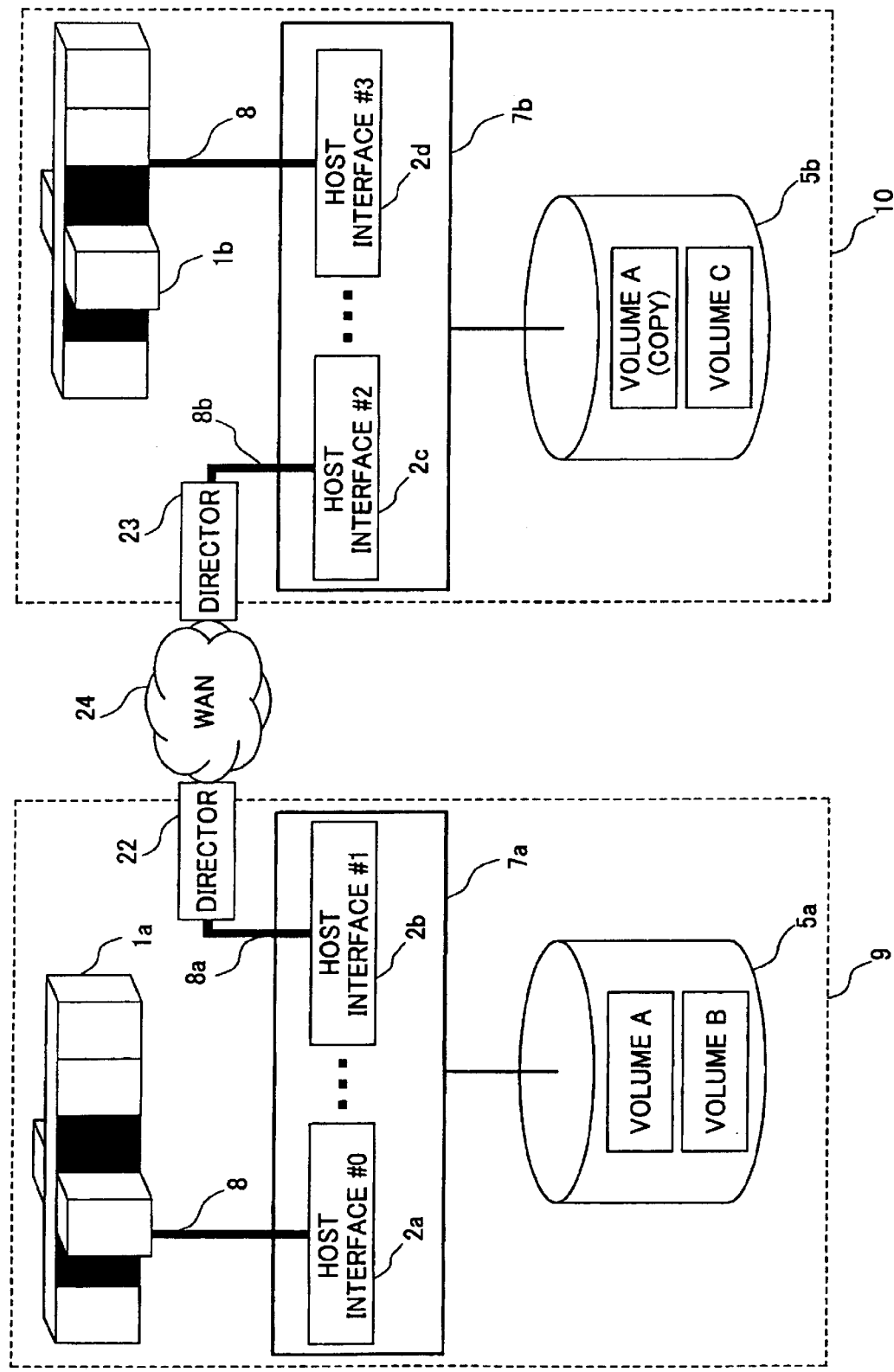
FIG. 4 is a block diagram showing one example of the configuration of a remote copy system using a WAN.

In order to extend the channel path connection to long distance, as shown in FIG. 4, a WAN (Wide Area Network) 24 provided by communication businesses such as NTT is commonly used. In this case, it is constituted with a conversion device, such as a director 22 or extender or switch, placed at the point of connection with the WAN 24.

Of such conversion devices, for example, there is the ULTRANET STORAGE DIRECTOR from the American company, CNT. This director 22 is used in a pair with another director 23 on both ends of WAN 24, and performs conversion between the protocol on channel 8a and the protocol on WAN 24. In this way, data on channel path 8a can be transmitted onto channel path 8b on the other side via WAN 24.

Because these conversions are performed independently, storage systems 7a and 7b using channel paths 8a and 8b and host computers 1a and 1b are not aware that they are going via WAN 24, and it appears equivalent to an ordinary channel path connection. Therefore, input/output of data over a long distance becomes possible without changing the storage systems and the programs on the host computers.

Of such conversion devices, for example, there is the ULTRANET STORAGE DIRECTOR from the American company CNT. This director 22 is used in a pair with another director 23 on both ends of WAN 24, and it transmits data on channel path 8a onto channel path 8b on the other side via WAN 24. Storage systems 7a and 7b using channel paths 8a and 8b and host computers 1a and 1b are not aware that they are going via WAN 24, and it appears equivalent to an ordinary channel path connection. Therefore, input/output of data over a long distance becomes possible without changing the storage systems and the programs on the host computers.

Figure 5:
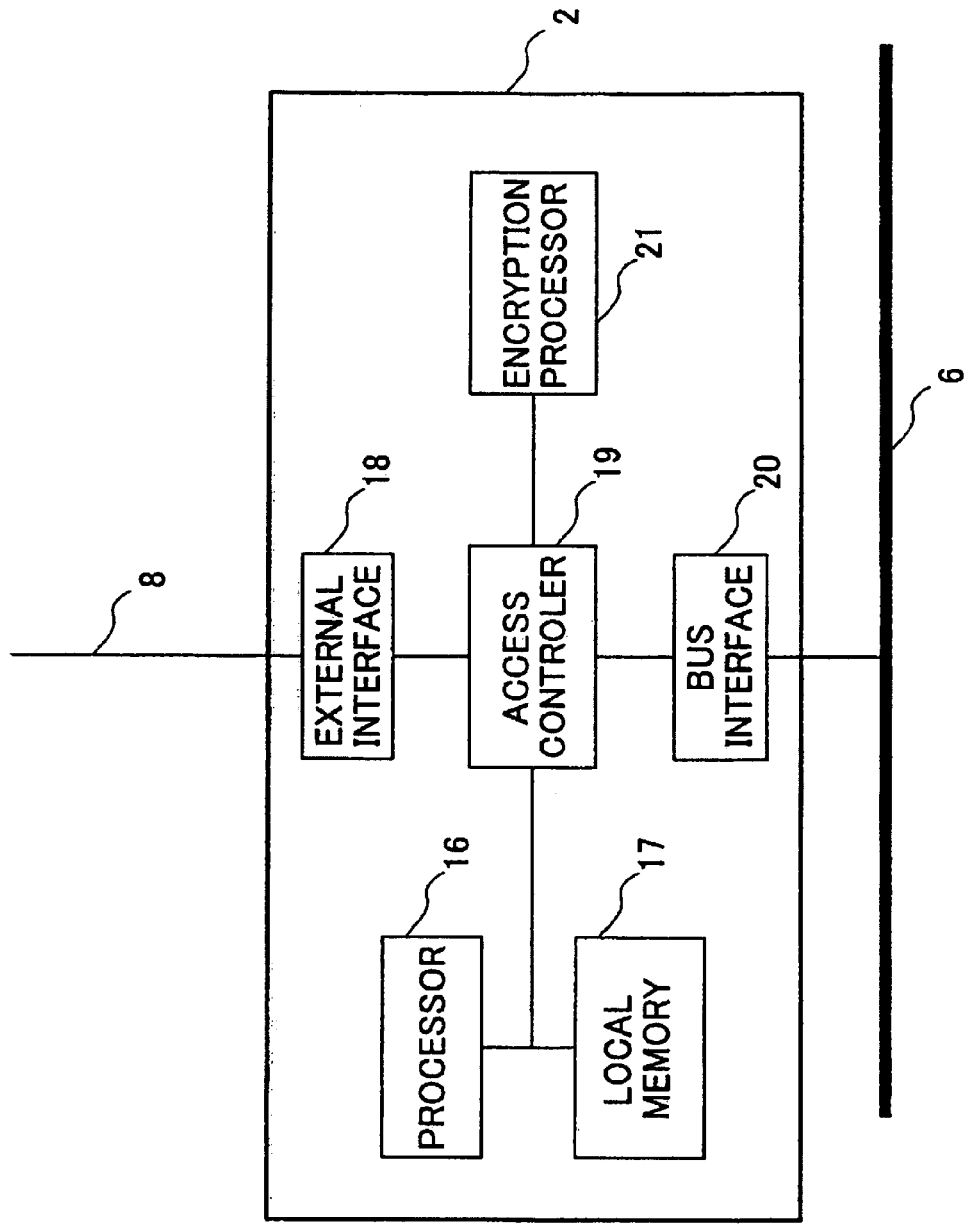
FIG. 5 is a block diagram showing one example of the internal configuration of a host interface.

When performing exchange of data over a WAN in such manner, data encryption is performed in order to preserve the secrecy of the data. A device that performs encryption and decryption can be considered in some cases, but here, the case when the storage system performs encryption will be explained. FIG. 5 shows an example of the internal configuration of host interface 2 when host interface 2 of the storage system performs encryption/decryption.

Host interface 2 is constituted by processor 16, local memory 17, external interface (external I/F) 18, access controller 19, bus interface (bus I/F) 20, and encryption processor 21.

A command given from the host via channel path 8 is received by external I/F 18, and it is received by processor 16 via the access controller. Processor 16 determines the contents of the command, and in the case of a write command, it writes to disk and cache via bus I/F 20 and bus 6. When the data is encrypted and decryption is necessary, the data decrypted using the encryption processor is written.

Similarly in the case of a read command, the contents of the disk or cache are read via bus I/F 20 and bus 6, and they are transmitted to the host via access controller 19 and external I/F 18. When the data is encrypted, the data is transmitted after being encrypted using the encryption processor.

Figure 1:
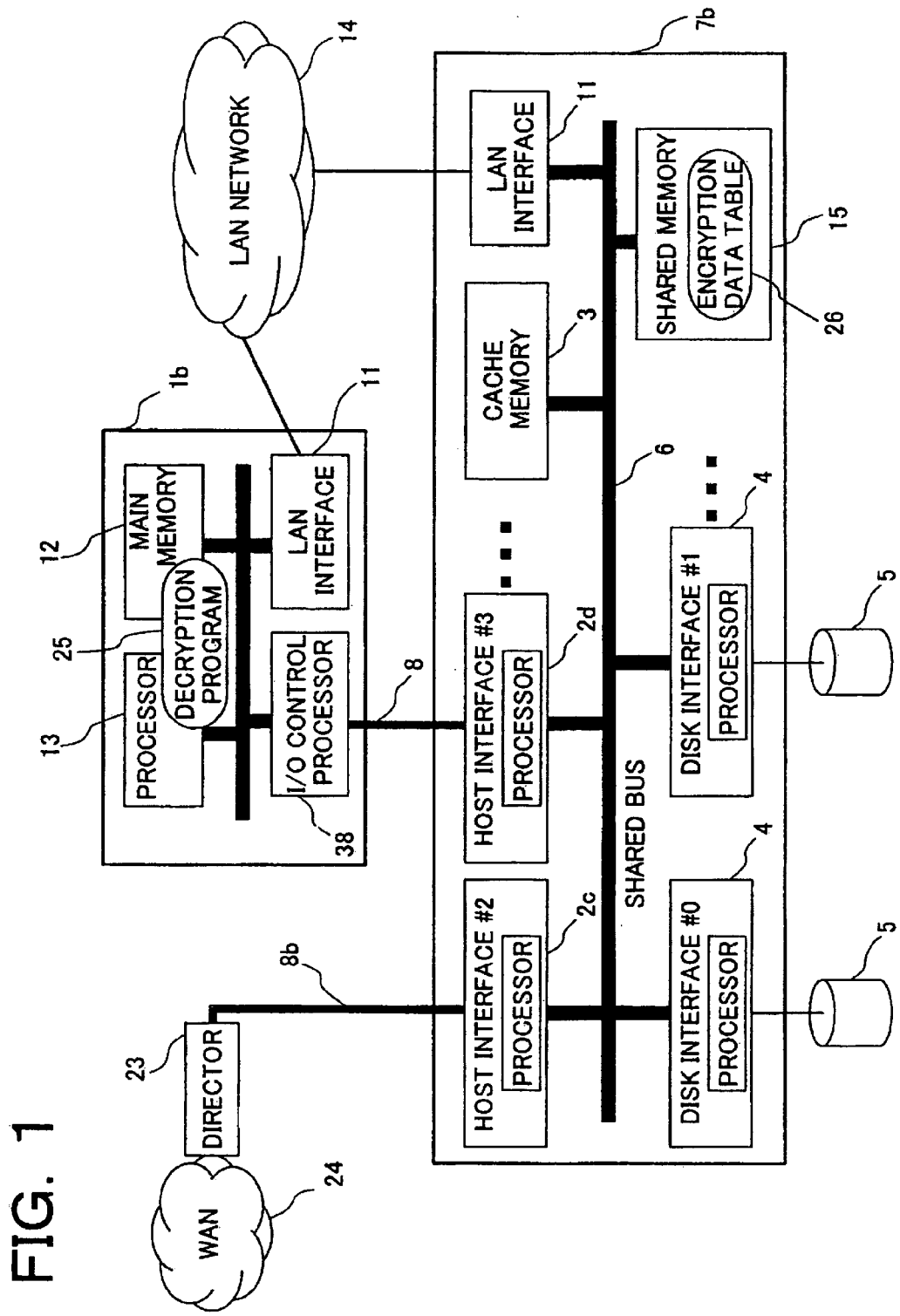
FIG. 1 is a block diagram showing one example of the configuration of a system for receiving remote copied encryption data.

In this manner, encryption and decryption in a storage system are generally performed during transmission and receipt of data. As compared to this, the data receiving method in remote copying of encrypted data according to the present invention is shown in FIG. 1. This method is applied to the remote system 10 shown in FIG. 4.

The configuration of the hardware of the storage system with the present method is fundamentally equivalent to the conventional system described with reference to FIG. 2, FIG. 4, and FIG. 5. The encryption processor in the storage system is not necessary. The present method is characterized in that decryption processing is performed asynchronously with data receipt, and the device that performs decryption is not the storage system, but the host.

The procedure for receipt and decryption of remote copy data by the present method will be explained with reference to the flow charts from FIG. 6 to FIG. 8.

Figure 6:
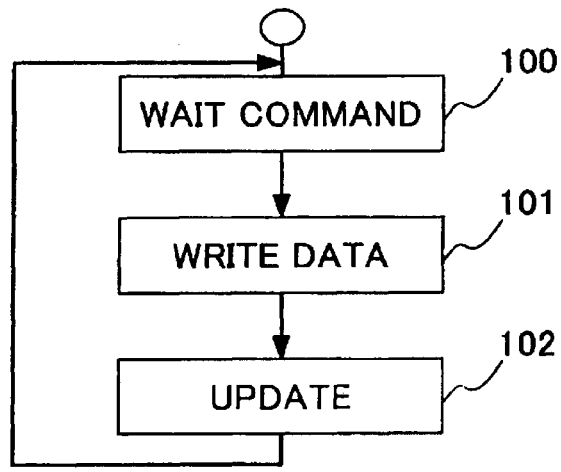
FIG. 6 is a flow chart of the processing of receipt of remote copy data.

A flow chart of the processing in the case of receipt of remote copy data is shown in FIG. 6. This processing is performed by host interface #2 (2c). Here, because this host interface is used exclusively for receipt of encrypted remote copy data, this flow chart shows the processing procedure for a write command in which the data portion is encrypted.

When an encrypted write command is received while waiting for a command (100), host interface #2 (2c) writes the data to the position specified by the write command on the disk (volume) specified by that command (101), and registers information of that write data to an encryption data table stored in shared memory (102).

Figure 9:
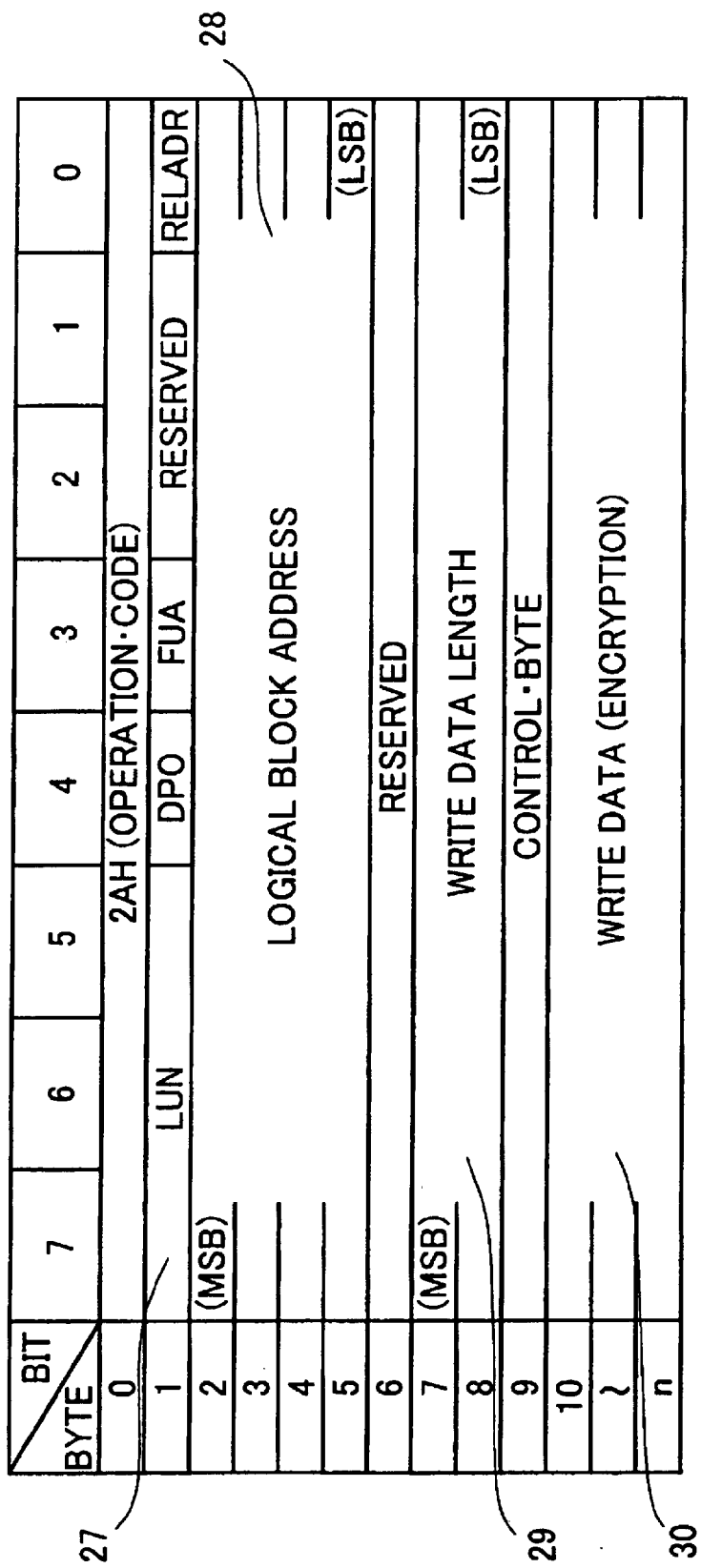
FIG. 9 is a chart showing one example of the format of an encrypted write command.

An example of the format of an encrypted write command is shown in FIG. 9. The case where the command on channel path 8b is a SCSI-2 command is shown. LUN 27 is a logical unit number field, and it specifies the disk (volume) as the destination of writing. Logical block address 28 indicates the position at which to start writing data. The length of the write data is indicated by write data length 29. Write data 30 itself is encrypted, and it is attached from the 10th byte onward. The other fields are not used by the present invention, so their explanation is omitted.

Figure 10:
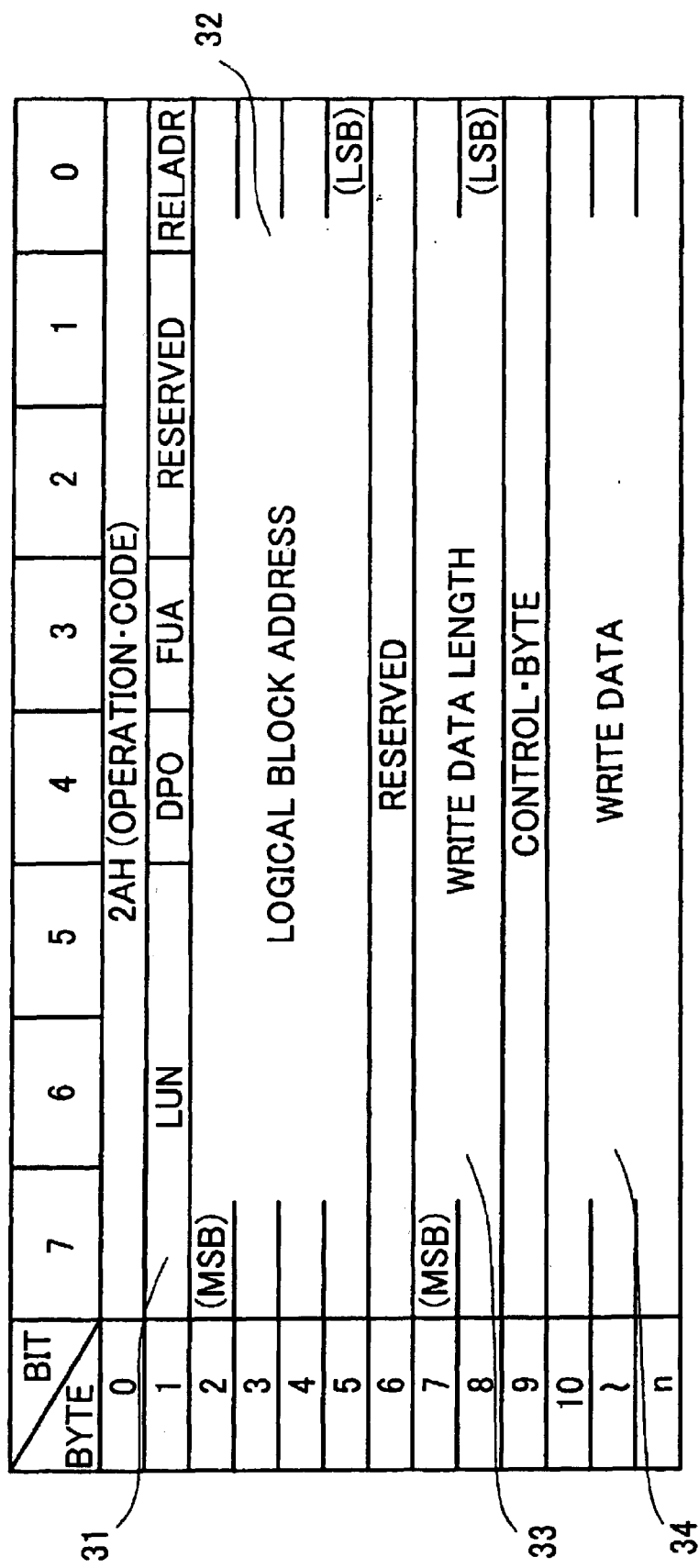
FIG. 10 is a chart showing one example of the format of a write command before being encrypted.

FIG. 10 shows the command format before being encrypted. As is clear by comparison with FIG. 9, only the data portion is encrypted. Therefore, host interface #2 (2c) which receives the data can write the data to the specified position on the disk without performing decryption processing.

It is assumed that the length of the data after encryption is the same as the length of the data before encryption. Such an assumption is accepted for example, in the DES (Data Encryption Standard) encryption system. The processing procedures used when the entirety of the command is encrypted and when an encryption system where the data length changes after encryption is adopted are shown in the second preferred embodiment.

FIG. 11 shows an example of the structure of the encryption table. This table consists of the fields of logical unit number 35, logical block address 36, and write data length 37. The meanings of these fields are the same as those of the fields of the same names in the write command. By referring to the data of this table, the position of the encrypted written data can be determined. For example, the first entry indicates that data of 100 blocks length from logical block address 10 on the disk (volume) of logical unit number 0 has been encrypted. The entry of logical unit number −1 indicates the last entry, that is, the end of the encryption table.

In the present method, decryption processing which takes a long processing time is not performed during data reception. Therefore, the throughput when receiving data can be improved. This is effective particularly in the case when encrypted data from a plurality of other parties is received.

Storage in such an encrypted state is very effective in some situations. For example, even if by chance data is stolen or leaked at the remote system, it is safe as long as the encryption key is not taken at the same time. That is, if the encryption key is not passed to the remote system, security against theft and unauthorized use as discussed above is assured. When the remote copy destination is used as a data safe box, such method is suitable.

On the other hand, when considering remote copying as a measure in case of a disaster, after the local system has gone down, it is necessary to restart business as quickly as possible using the copied data and the remote system. For this purpose, when restarting business, it is necessary to restore the copied data to plaintext. In accordance with the present invention, this decryption is performed by the host computer of the remote system.

Figure 7:
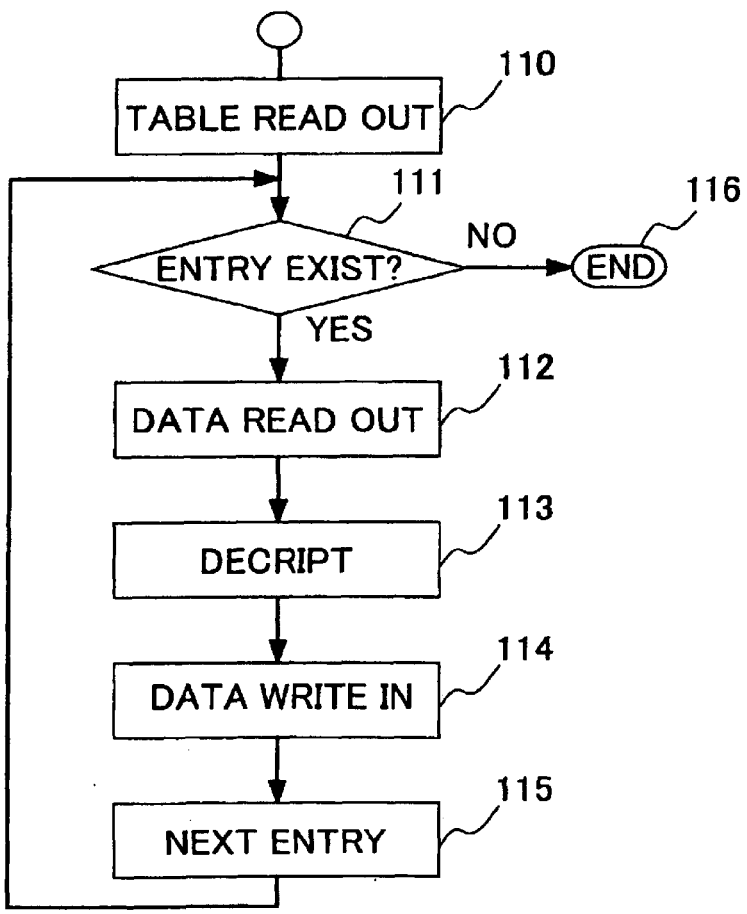
FIG. 7 is a flow chart of the processing of decryption.
Figure 8:
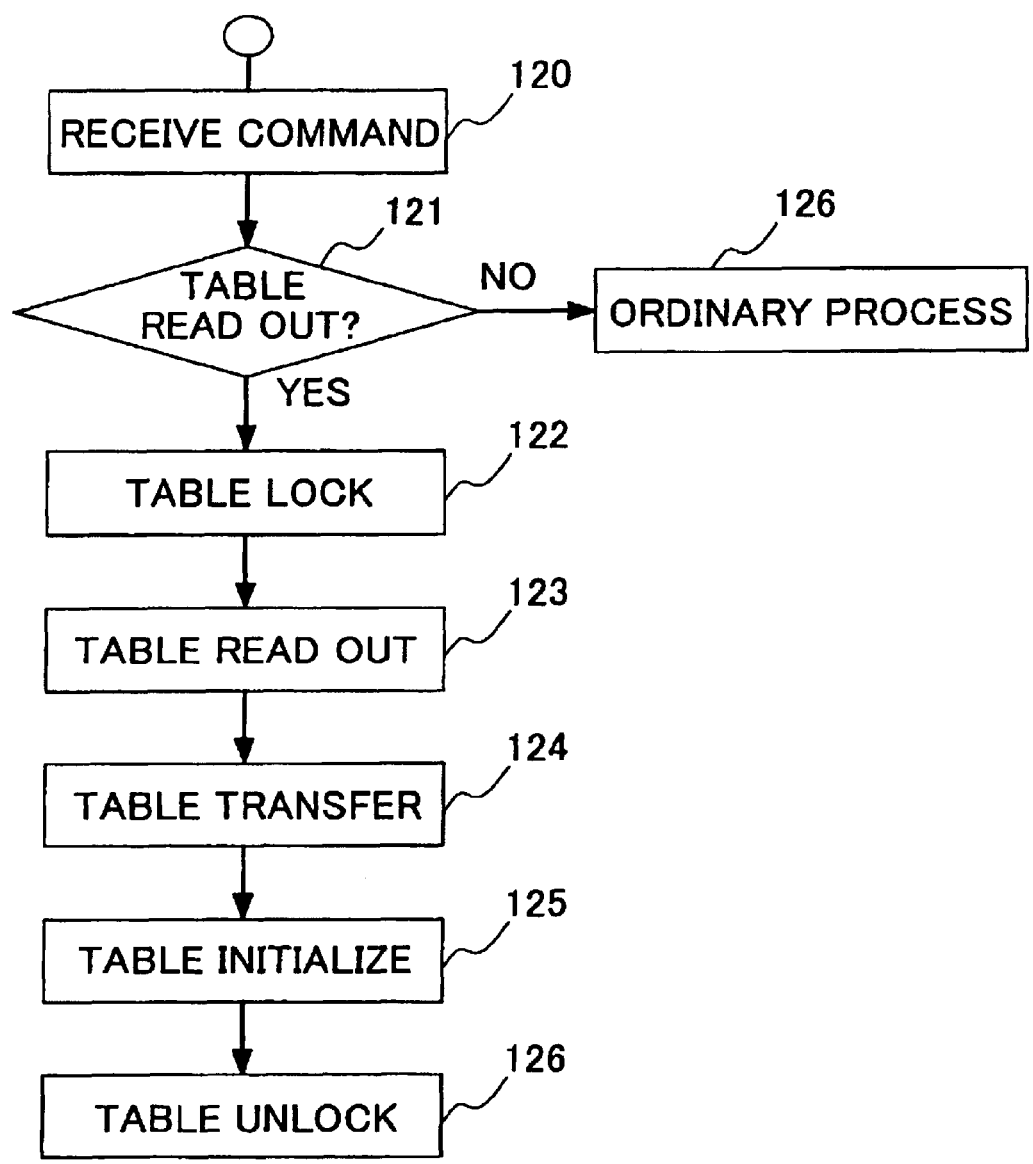
FIG. 8 is a drawing showing a flow chart showing the processing procedure of the host interface.

A flow chart of decryption processing is shown in FIG. 7. This processing is performed by decryption program 25 on host computer (1b). First, the encryption table in the disk control unit is read (110). Host computer (1b) obtains the position of the data requiring decryption by referring to this table.

Next, the entry information of the read encryption table is referenced, the data requiring decryption is read from the disk system (111–112), decryption processing is performed (113), and it is written back to the same position on the disk system (114). This decryption is repeated for all entries in the encryption table (115, 111, 116). By this series of processing, the encrypted data on the disk is decrypted into plaintext.

In the present preferred embodiment, the encryption table is stored in the shared memory of the disk system. Accordingly, for host computer (1b) to read the encryption table, an exclusive read command is used. This exclusive command, for example in the case of a SCSI-2 command system, is realized by treating the first 8 bits of the command as a value that is not used by the standard.

This encryption table read command is generated by I/O control processor 38 of host computer (1b), and it is interpreted by host interface #3 (2d) of disk control unit 7b. That is, host interface #3 (2d) processes the encryption table read command in addition to ordinary read and write commands. The procedure used by host interface #3 (2d) for realizing this processing is shown in the flow chart in FIG. 8.

Host interface #3 (2d), after receipt of the command (120), checks whether that command is an encryption table read command (121). When it is other than an encryption table read command, ordinary command processing is performed (126).

When it is an encryption table read command, the encryption table in shared memory first is locked (122). By this locking, other host interfaces having received encrypted remote copy data are prevented from updating the encryption table and transmitting incomplete data to the host while host interface #3 (2d) is reading the encryption table. Accordingly, while this lock is effective, update processing of the encryption table explained with reference to the flow chart in FIG. 6 is reserved.

After the locking is completed, the contents of the encryption table are read (123), and they are sent to the host (124). Next, the encryption table is initialized (125). The reason for initialization is that, because the area indicated by the contents of the encryption table sent to the host is necessarily decrypted, this information no longer needs to be kept. Finally, the lock of the encryption table is released (126), and the series of processing is finished such that the position of newly received encryption data can be stored.

In order for the host present in the remote system to decrypt encrypted data, it must receive the encryption key from the local system. This exchange of the encryption key is performed during the start of the remote copy. In FIG. 4, when the "initialization & copy start command" for remote copy has been issued from host 1a to disk control unit 7a of the local system, the encryption key is passed from the local disk control unit 7a to the remote disk control unit 7b, and then copying of the data is started. Furthermore, when remote host 1b has issued an encryption table read command for decryption, the encryption key together with the encryption table is passed from disk control unit 7b to host computer 1b.

Such exchange of the encryption key is not necessary when the encryption system is a public key cryptosystem. However, a public key cryptosystem has the drawback that the encryption speed is very slow compared with a private key cryptosystem. On the other hand, there is a secrecy problem also with transmitting a private key as is over a WAN. Therefore, a system whereby encryption of remote copy data is performed with a private key cryptosystem and the encryption key is encrypted with a public key cryptosystem and passed only for the previously described exchange of the encryption key is efficient.

Also, the disk control unit of the present invention is equipped with a LAN interface. Accordingly, local disk control unit 7a and remote host 1b also can directly send and receive the encryption key via a LAN. In this case as well, there is a secrecy problem in transmitting the encryption key as is over the LAN. Accordingly, in this case, it is transmitted using a protocol that performs communication while preserving secrecy over a LAN, such as HTTPS and IPsec, which are well-known technologies.

There are multiple embodiments of the timing for execution of decryption performed by the host shown in FIG. 7. One is a method that executes decryption at a fixed time interval. That is, decryption program 25 on the host reads the encryption table at a fixed time interval and decrypts following the contents thereof.

When a large quantity of encrypted remote copy data has been received, the area for the encryption table in the shared memory may be insufficient. In such case, a notification is given from disk control unit 7b to decryption program 25 on the host, and decryption processing is started up.

The notification is given from host interface #2 (2c) to host interface #3 (2d), and host interface #3 (2d) transmits the decryption processing startup command to host computer 1b. I/O control processor 38 of host computer 1b, having received the decryption processing startup command, gives a notification to decryption program 25 and starts decryption processing. The decryption startup command applies an undefined command as one of its availabilities in the same manner as the encryption table read command.

Also, host computer 1b and disk control unit 7b are connected by a LAN. Accordingly, the startup of decryption processing also can be communicated via the LAN using the LAN interface.

In the preferred embodiment up to here, it was explained that the encryption table is placed in shared memory 15 in disk control unit 7b. However, the storage location of the encryption table is not limited to this. For example, the objects of the present invention can be achieved also when it is placed on a special disk (volume) managed by the disk control unit. In this case, reading of the encryption table by host computer 1b can be executed by an ordinary disk read command.

Furthermore, the device that performs decryption also is not limited to host computer 1b. In accordance with the present invention, there is proposed a system that makes the time interval from receipt processing of encrypted data to the start of decryption processing arbitrary by using an encryption table and is capable of executing each processing asynchronously. Accordingly, it can be applied in the same manner in the case when the device that performs decryption is the host interface and even in the case when it is a decryption device connected to common bus 6 in disk control unit 7b.

Figure 14:
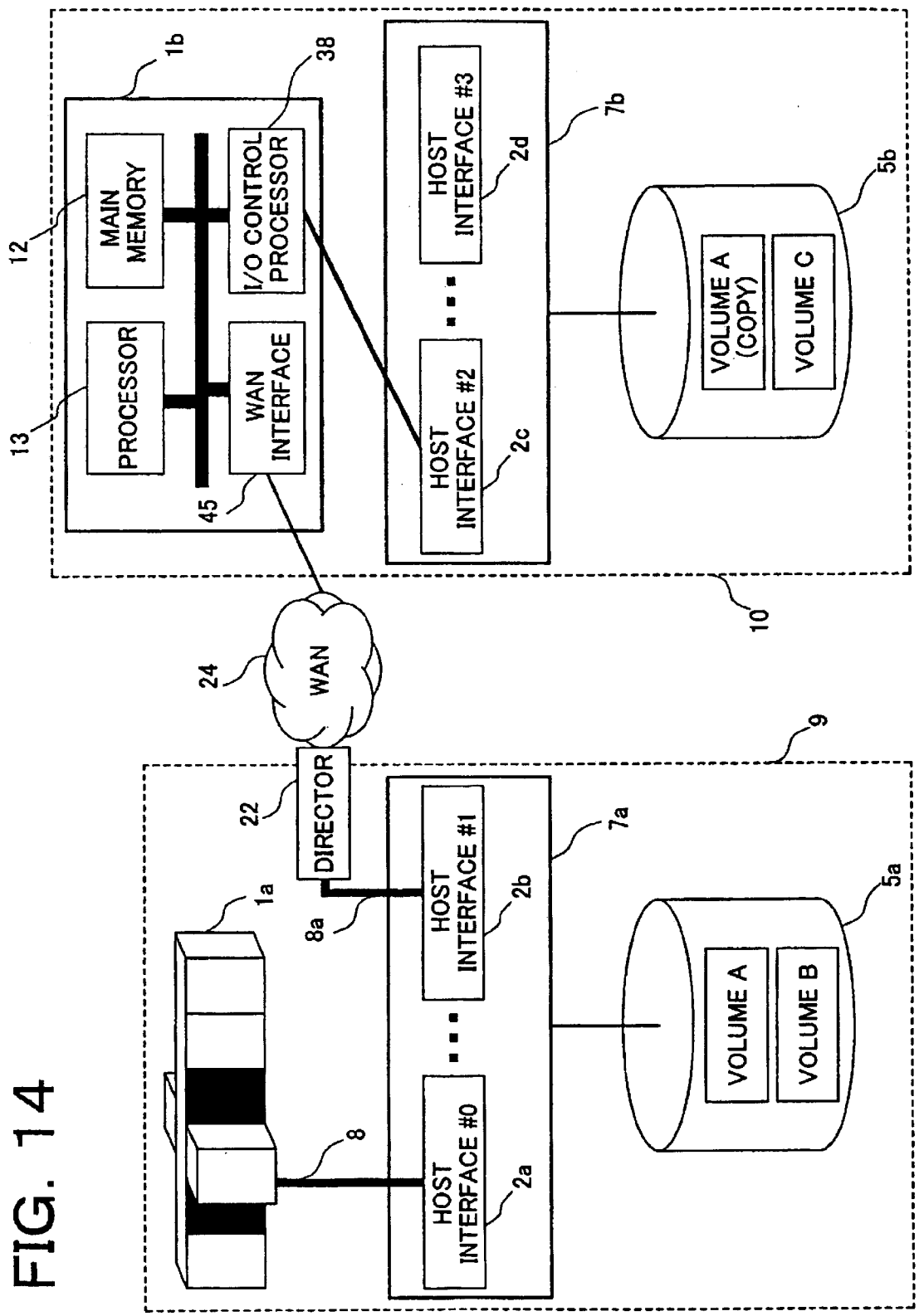
FIG. 14 is a block diagram showing another example of the configuration of a remote copy system using a WAN.

Also, as shown in FIG. 14, it can be applied also in the case when the host itself receives remote copy data. In this case, the host receives encrypted data and writes it to the disk system without decrypting, and then reads the encrypted data from the disk system and rewrites it after decrypting. Furthermore, with respect to all of these embodiments, the decryption processing can achieve the same effect not only with software alone, but also with decryption hardware or a combination of hardware and software.

The second preferred embodiment of the present invention will be explained. In the present preferred embodiment, a case in which not only the data portion of remote copy data, but all portions including the command parameters, such as a logical unit number, are encrypted will be explained. That is, this is a case in which all fields in FIG. 9 are encrypted. Also, in the case when encryption is performed outside the disk control unit, because separation of the command parameters and the data portion is difficult, it becomes in the same state. In further detail, it is a case when encryption is performed beyond channel path 8a in FIG. 4.

Figure 12:
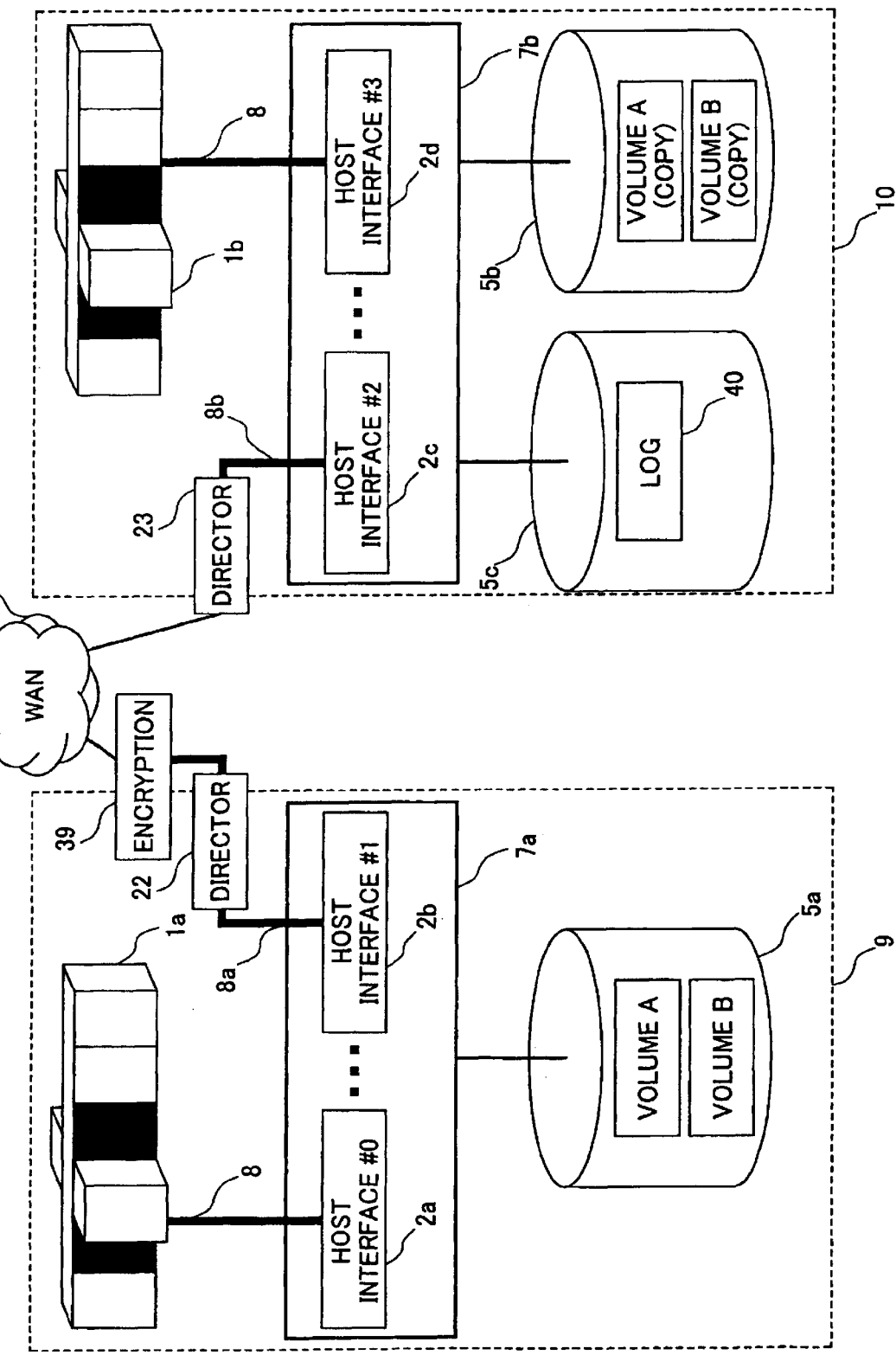
FIG. 12 is a block diagram showing one example of the configuration of a remote copy system which encrypts at the entrance to a WAN.

Henceforth, the case when encryption is performed between the director of local system 9 and the entrance of the WAN as shown in FIG. 12 will be explained as an example. In this configuration, packets with all portions encrypted are delivered to host interface #2 (2c) of disk control unit 7b. Host interface #2 (2c) stores in sequence the received packets, as they are without decryption, in log volume 40. By writing without performing decryption, which takes a long processing time, the throughput of receipt can be improved. Also, by storing the packets in log volume 40 in this manner, unclear data can be stored temporarily until the proper storage position is decrypted.

Figure 15:
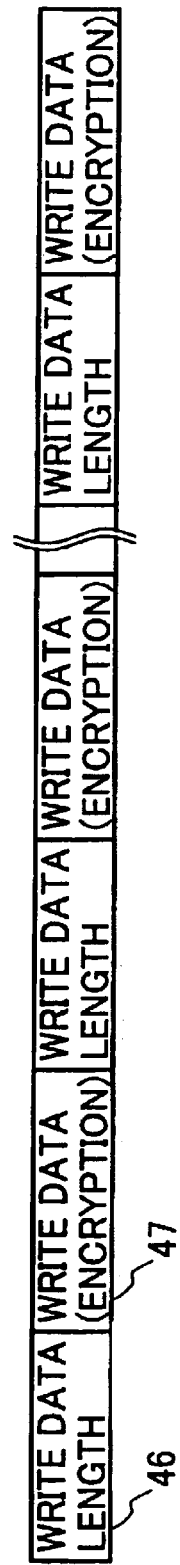
FIG. 15 is a diagram showing an example of the structure of the format of a log volume.

The format of log volume 40 is shown in FIG. 15. The log volume is stored in the order the data was received, in a sequential format with a write data length 46 and write data 47 as a group.

Decryption program 25 on host computer (1b) reads log volume 40 at an arbitrary timing. As opposed to the first preferred embodiment, because the log volume is the same as an ordinary volume, decryption program 25 reads it with an ordinary read command.

Encrypted packets read by decryption program 25 are decrypted on the host and the command parameters and the data become plaintext. Here, the data is written to the positions on the disk specified by the command parameters. By this series of processing, the encrypted data is decrypted, and it is stored to the intended positions on the disk.

A method that uses a log in this manner was described also in the explanation of the first preferred embodiment, but it is used also in the case when an encryption system in which the length of the data changes is used and the encryption data cannot be written into the intended position on the disk.

As for the timing at which decryption performed by the host is executed, just as with the first preferred embodiment, all methods, being a method that executes at a fixed time interval, the method that gives notification from disk control unit 7b to decryption program 25 on the host, and the method that gives notification using a LAN interface, can be applied.

Also, in regard also to the device that performs decryption, just as with the first preferred embodiment, it is not limited to host computer 1b, and the host interface or a decryption device connected to common bus 6 in disk control unit 7b, decryption hardware, a combination of hardware and software, or the like, can be used.

In the explanation up to here, an example was considered where packets with all portions encrypted are written to log volume 40 by host interface #2 (2c). However, the same effect can be obtained also with a configuration whereby director 23 issues commands to write into the log volume. In this case, director 23 has the function not only of simply converting protocols, but also of generating arbitrary data write commands.

Figure 13:
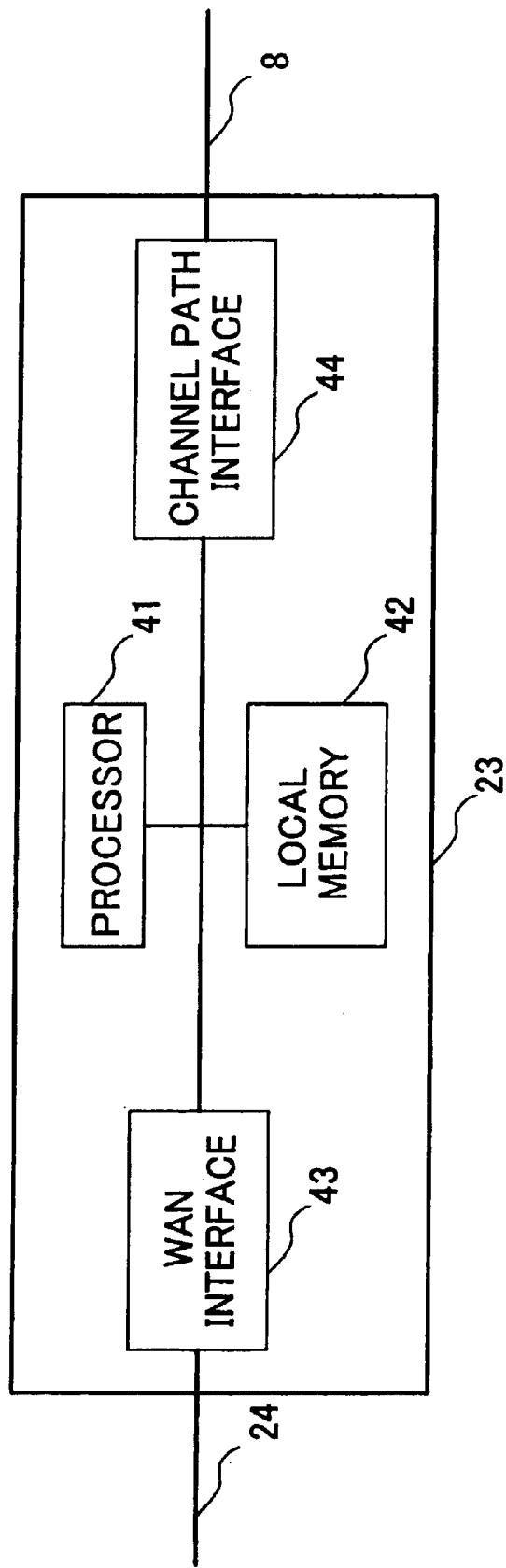
FIG. 13 is a block diagram showing one example of the internal configuration of a director.

FIG. 13 shows an example of the internal configuration of director 23. Director 23 is equipped with processor 41, local memory 42, WAN interface 43, and channel path interface 44. Packets received from the WAN interface are submitted to protocol conversion by processor 23, and they are sent to channel path 8 by channel path interface 44. The aforementioned function of generating "arbitrary data write commands" is realized by the processor and software on director 23.

Next, the exchange of encryption keys will be explained. Encryption device 39 as shown in FIG. 12 is generally used in a pair for encryption-decryption. Exchange of encryption keys and encryption of data are performed between this pair of devices so that communication having preserved secrecy become possible.

In accordance with the present invention, encryption device 39 is not used in a pair. Therefore, the remote system has a function that can respond to the encryption key exchange procedure of encryption device 39 of the local system. This function will be explained with reference to encryption by a VPN (Virtual Private Network) as an example.

VPN is realized with technology called IPsec. IPsec is prescribed by the RCF 1825 standard to RCF 1829 standard and RCF 2401 standard to RCF 2412 standard, which are established by IETF (Internet Engineering Task Force) being an international organization. By these standards, the encryption key exchange protocol IKE (Internet Key Exchange) is prescribed. Therefore, exchange of the encryption key with the system configuration in FIG. 12 is realized by performing processing responding to IKE on the remote system side. IKE is a processing standard for IP (Internet Protocol) packets, being one of the protocols on a WAN. Therefore, in accordance with the present invention, by the fact that director 23 connected to the WAN performs IKE processing, the encryption key is acquired so that decryption is made possible. Director 23, as shown in FIG. 13, has a processor, and IKE processing is realized by processing of the IP packets received by the LAN interface using this processor.

The encryption key received by director 23 is passed to disk control unit 7b using an unused command of SCSI-2 as was used also in the first preferred embodiment. Furthermore, in the same manner as the first preferred embodiment, it is passed to host computer 1b. Also, the method of passing the encryption key can be via a LAN in the same manner as the first preferred embodiment.

By the above procedure, a means for simultaneously receiving a large amount of encrypted data on a remote system receiving encrypted data by remote copy, and the like, is achieved, which is the object of the present invention.

In the above first and second preferred embodiments, for the sake of simplicity of explanation, the local system and the remote system were considered to be in a one-to-one configuration. However, the present invention exhibits a further effect by applying a many-to-one arrangement, that is, a remote system that simultaneously receives data from a plurality of local systems.

Furthermore, in the first and second preferred embodiments, remote copy was considered as an example, but the invention can be applied also to a general client-server configuration. In this case, the local system corresponds to the client, and the remote system corresponds to the server.

Figure 16:
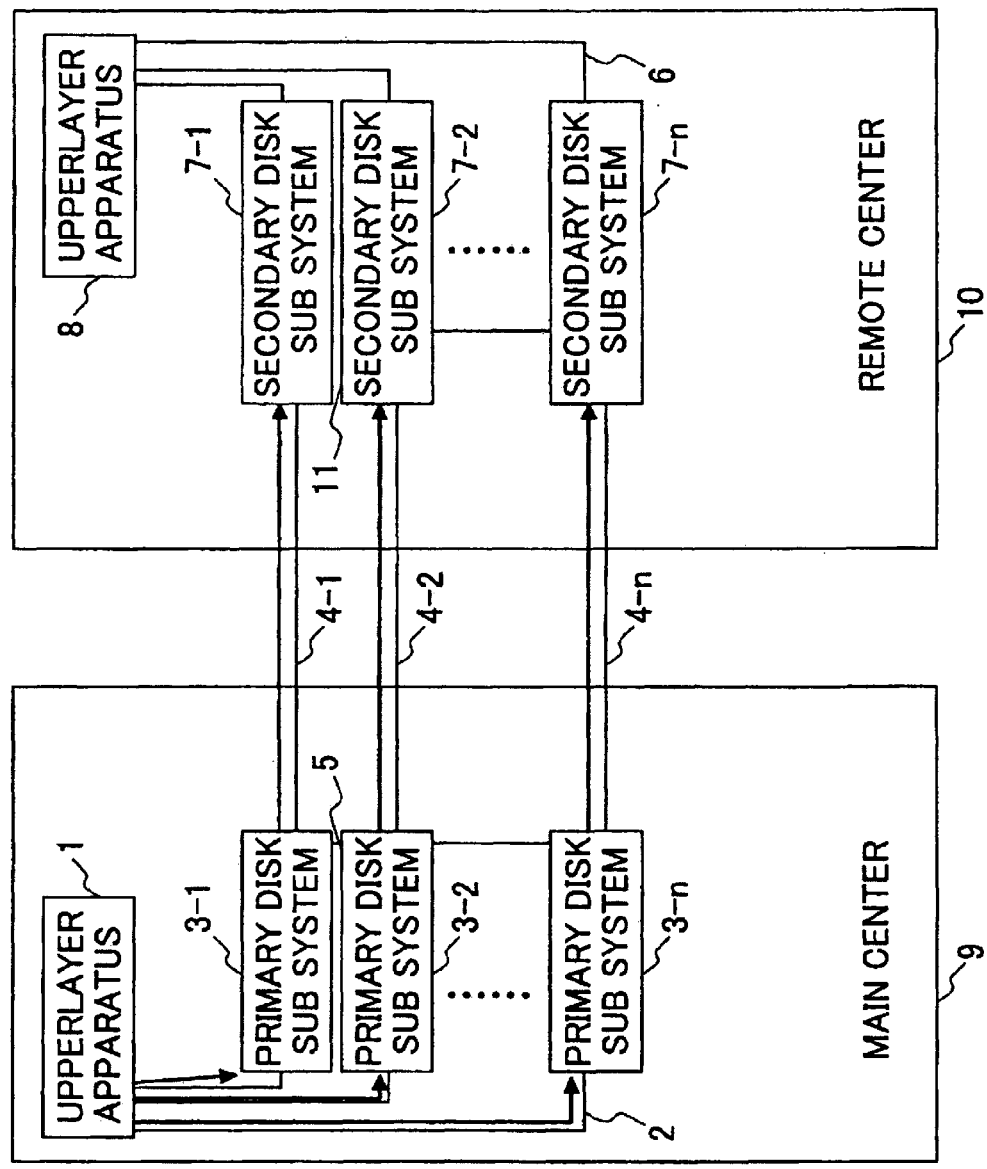
FIG. 16 is a block diagram showing the overall configuration of a computer system with remote copy facility pertaining to one preferred embodiment of the present invention.

A computer system with remote copy facility pertaining to a preferred embodiment of the present invention will be explained as follows. FIG. 16 shows the overall configuration of a computer system with a remote copy facility pertaining to the third preferred embodiment of the present invention, and FIG. 18 shows the configuration of the primary disk subsystem of the main center related to the present preferred embodiment.

FIG. 16 shows an example of the configuration when one preferred embodiment of the present invention is applied in order to perform replication of information (data) between any two centers in a plurality of data centers furnished with computer systems.

One or a plurality of disk subsystems 3 (3-1, 3-2, ..., 3-n) on the side of main center 9 and one or a plurality of disk subsystems 7 (7-1, 7-2, ..., 7-n) on the side of remote center 10 are connected without going through upper layer devices (host computers) 1 and 8, so that a remote copy system is realized that performs replication of data between both centers. As a connection of disk subsystems that do not go through upper layer devices, SAN (Storage Area Network) can be pointed.

Figure 18:
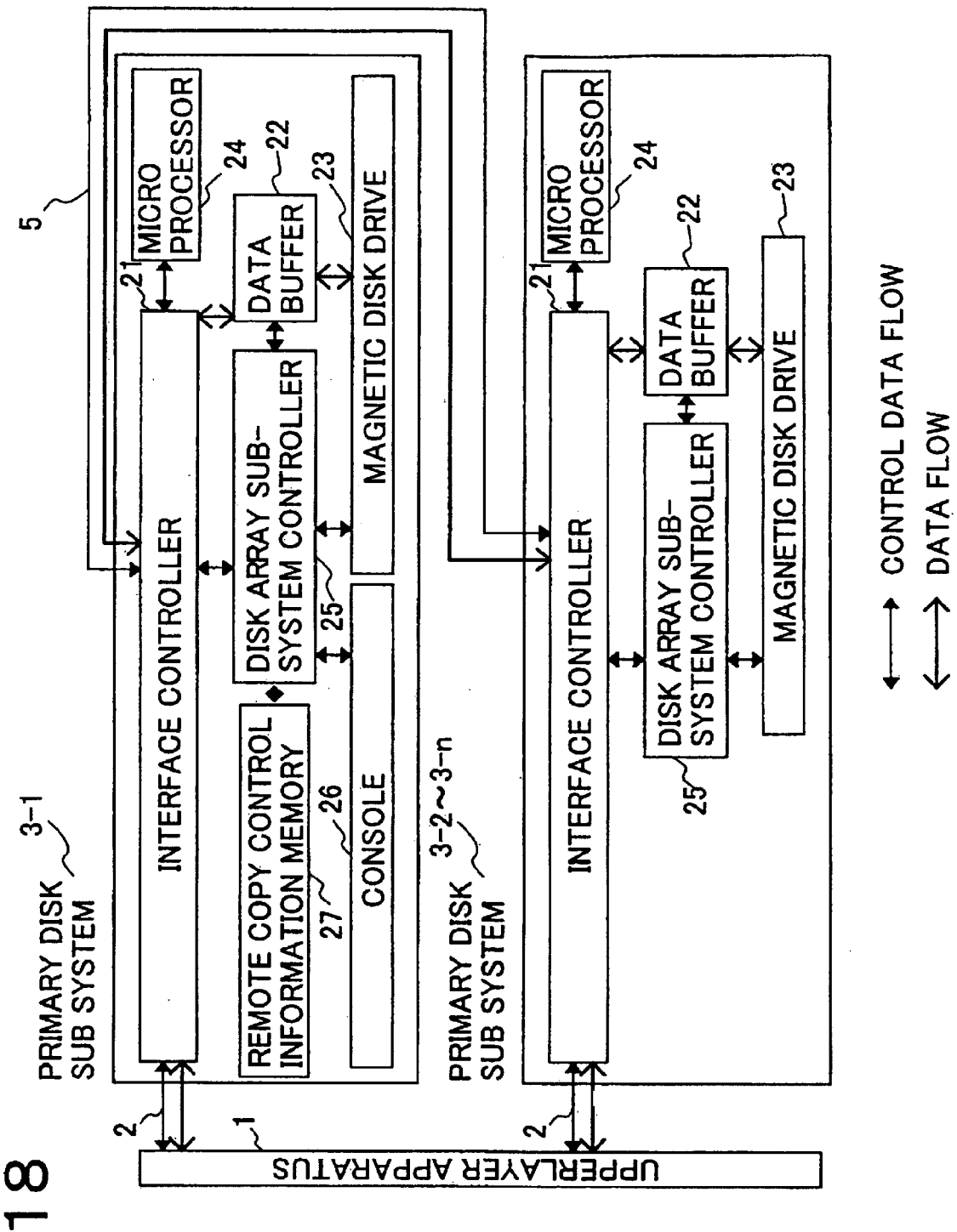
FIG. 18 is a block diagram showing the configuration of the primary disk subsystem of the main center related to the present preferred embodiment.

FIG. 18 shows an example of the configuration of disk subsystem 3 of main center 9. At main center 9 in FIG. 16, upper layer device 1 having a central processing unit (CPU) that performs data processing is connected to primary disk subsystems 3-1, 3-2, ..., 3-n via interface cables 2 serving as transmission paths.

Primary disk subsystem 3-1, also 3-2, ..., 3-n, as shown in FIG. 18, is equipped with interface controller 21, which performs sending and receiving of data (including information) from upper layer device 1, data buffer 22 which stores data referenced or updated from upper layer device 1 and information related to the storage position of updated data while remote copying is temporarily stopped, magnetic disk drive 23 as a recording medium for recording this data, microprocessor 24 which controls exchange of the data, and disk array subsystem controller 25 which controls each of these elements. Interface controller 21 is also an interface that performs sending and receiving of data with remote center 10.

Also, primary disk subsystem 3-1, in addition to the constituent element group described above, is equipped with console 26 by which the user establishes those settings at which remote copying is performed, and remote copy control information storage component 27 which stores control bits representing the present status of remote copying according to control information set by console 26.

Primary disk subsystem 3-1 of main center 9 is connected to secondary disk subsystem 7-1 of remote center 10 via interface cable 4-1. Similarly, primary disk subsystem 3-2 is connected to secondary disk subsystem 7-2 via interface cable 4-2, and a configuration such that primary disk subsystem 3-n is connected to secondary disk subsystem 7-n of the remote center via interface cable 4-n is adopted.

In addition, interface cables 4-1, 4-2, ..., 4-n can also be connected with a general public communication circuit using a circuit connection device, and the like. In the present configuration example, it is described as interface cables 4-1–4-n including this point.

Also, when disk subsystem 3 has a plurality of units, disk subsystem 3-1 is connected via interface cable 5 to disk subsystems 3-2, ..., 3-n other than disk subsystem 3-1 in which the data as object of remote copying is stored at main center 9. Thus, a configuration is adopted in which, on the side of main center 9, with regard to disk subsystem 3-1 in which the data as an object of remote copying is stored, the entirety of the primary disk subsystem group 3 is connected by an interface cable 5.

Primary disk subsystem group 3 is a disk subsystem group that, when a data write request is issued to primary disk subsystem group 3 by upper layer device 1, writes said data to data buffer 22 within its own subsystem in synchronization with this, and, furthermore, it gives a data write instruction to secondary disk subsystem group 7 present in a remote location asynchronously with the timing that the data has been written to data buffer 22 within its own subsystem. The data written to data buffer 22 within its own subsystem is synchronously or asynchronously recorded on magnetic disk drive 23.

Remote copy methods that write data asynchronously to a remote location include a mode in which primary disk subsystem group 3 at main center 9 transfers updated data to secondary disk subsystem group 7 at remote center 10 to which its own subsystem is connected, following the order in which the volume within its own subsystem was updated, and secondary disk subsystem group 7 at remote center 10 reflects the updated data to the volume within its own subsystem following the order received; and a mode in which main center 9 transfers the data as an object of transfer, arranging at the optimally scheduled opportunity at primary disk subsystem group 3 independently of the order in which the volume within its own subsystem was updated, and secondary disk subsystem group 7 at remote center 10 reflects the updated data to the volume within its own subsystem following the order updated regardless of the order received.

Secondary disk subsystem group 7 stores in data buffer 22 within its own subsystem data received via interface controller 21 from primary disk subsystem group 3 connected by interface cable 4. That is, there is a system configuration such that, when there has been a data write instruction from upper layer device 1 to one or a plurality of disk subsystems 3-1, 3-2, ..., 3-n, the same data is stored also in one or a plurality of disk subsystems 7-1, 7-2, ..., 7-n within remote center 10. The arrow in FIG. 16 indicates the flow of data for which there was a write instruction from upper layer device 1.

Primary disk subsystem group 3 has control bits indicating the status of encryption in remote copying within remote copy control information storage component 27, and the remote copying can be put into a temporarily stopped state by changing this control-bit information based on instruction by the system operator at an opportunity set in advance by the system operator or at an opportunity of irregular interval or at any time. In addition, in one embodiment of the present invention, an updated cryptographic key is communicated from the primary side to the secondary side in this temporarily stopped state (details to be described later). When remote copying is temporarily stopped, primary disk subsystem group 3, without issuing updated data, reserves write instructions to secondary disk subsystem group 7.

Here, in the remote copy control information storage component of primary disk subsystem 3-1, there may be stored control information stipulating whether or not to perform encrypted data transfer while performing remote copying of data to said secondary disk subsystem group. When said control information stipulates that encrypted data transfer is to be performed, data encryption is performed and the data is transferred. Also, meanwhile, at said secondary disk subsystem group, said control information of said primary disk subsystem group is confirmed, and when said control information is such that encrypted data transfer is performed, processing appropriate to encryption is performed on the transferred data (for example, treating it so as to decrypt the transferred data using the cryptographic key), whereby compatibility of the data copied from the main center to the remote center can be achieved.

In accordance with the present invention, because compatibility of the cryptographic keys used on data at the main center 9 side and data at the remote center 10 side can be achieved by temporarily stopping remote copying in this manner and notifying the remote center of the updated cryptographic key during this period, updating of the cryptographic key for remote copying can be realized without interposing an upper layer device. Therefore, the same function can be realized not only with a mainframe, but also with an open system.

Also, primary disk subsystem group 3 can release the above-mentioned temporarily stopped state based on an instruction by the system operator at an opportunity set in advance by the system operator or an opportunity of irregular interval or at any time.

When the temporarily stopped state is released, primary disk subsystem group 3, in the case when a data write request is issued from upper layer device 1 to primary disk subsystem group 3, writes the data to data buffer 22 within its own subsystem in synchronization with this, and, furthermore, it gives a data write instruction to secondary disk subsystem group 7 present in a remote location asynchronously with the timing of writing the data to data buffer 22 within its own subsystem. And, the updated cryptographic key is used when actually transferring the data to the remote center.

By adopting such a configuration, updating of the cryptographic key is possible with the same timing in the volume of primary disk subsystem group 3 as the object of remote copying within the main center 9 and the volume of secondary disk subsystem group 7 within the remote center 10. Furthermore, while remote copying is in a temporarily stopped state in primary disk subsystem group 3, the state of the data of primary disk subsystem group 3 at the main center 9 at the time when primary disk subsystem group 3 was put into a temporarily stopped state and the state of the data at secondary disk subsystem group 7 at the remote center 10 match. That is, a state of data where consistency is assured between the two centers at said time is assured and maintained.

In addition, temporary stopping of remote copying and release of the temporary stopping can be set in units of volume pairs for remote copying. It is also possible to change the state in a volume group unit by setting a plurality of volume pairs to a single volume group. And, a user can recognize whether or not remote copying is presently being performed or in what kind of unit remote copying is being performed by displaying an indication of temporary stopping or release of temporary stopping on a console of either subsystem 3 or subsystem 7 or upper layer device 1 or upper layer device 8, or a monitor used when managing these systems.

The intervals of this temporary stopping and release of temporary stopping of remote copying can be arbitrarily set by a user. Here, a cycle will be described in which remote copying from main center 9 to remote center 10 is performed, then it is temporarily stopped and the updated cryptographic key is transmitted, then the temporary stopping is released and again remote copying is performed, with the time for increase of the danger of deciphering from interception of transferred data for remote copy as the period. Of course, the intervals of temporary stopping and release of temporary stopping may be set without being constrained to this example.

Upper layer device 8 is a central processing unit that is connected by interface cable 6 to secondary disk subsystem group 7 in remote center 10, and it performs referencing and updating with respect to secondary disk subsystem group 7. Upper layer device 8 can serve as a substitute for upper layer device 1 to perform processing when upper layer device 1 of main center 9 can no longer perform normal functions due to a disaster or failure, or the like. In addition, it can perform processing different from that of upper layer device 1 of main center 9 independently of upper layer device 1, using data stored in secondary disk subsystem group 7.

However, when upper layer device 8 does not perform processing on secondary disk subsystem group 7, and when it does not have the substitute function for upper layer device 1, upper layer device 8 is not needed. Conversely, by providing upper layer device 8, connecting disk subsystem 7-1 with other disk subsystems 7-2–7-n by interface cable 11, and configuring it in the same manner as primary disk subsystem group 3 of main center 9, it is possible also to make main center 9 in FIG. 16 function as a remote center and remote center 10 function as a main center.

As an embodiment of the present invention, a method of data replication and its operation will be explained with reference to FIG. 17. The files or volumes in disk subsystem 3, where data as an object of replication is stored, are selected in advance by an operator according to the need for replication, that is, remote copying. And, the relationship between the object files or object volumes and disk subsystem 3, and the files or volumes and disk subsystem 7 used to store the copies of the selected data, as well as whether or not compatibility of the order of updating, which must always be maintained during replicating, are set in advance by the operator into remote copy control information storage component 27 within primary disk subsystem 3-1 from upper layer device 1 or console 26, or the like.

Also, for primary disk subsystem 3-1, the opportunity for temporarily stopping remote copying and the opportunity for releasing the temporary stopping are set. Because the setting of the opportunities can be instructed from upper layer device 1, it is possible to schedule in advance the instruction opportunities from upper layer device 1 by a program on upper layer device 1 that supports automation of operation.

In the event of the above-mentioned selections and settings, when there is a disk subsystem 3 that can connect or equip a dedicated console 26, they can be set through that console 26 without using upper layer device 1. In the present example, temporary stopping of remote copying and release of temporary stopping are set so as to be performed at an irregular interval in primary disk subsystem 3-1 by the operator in advance using time values held inside primary disk subsystem group 3 without using upper layer device 1.

Figure 17:
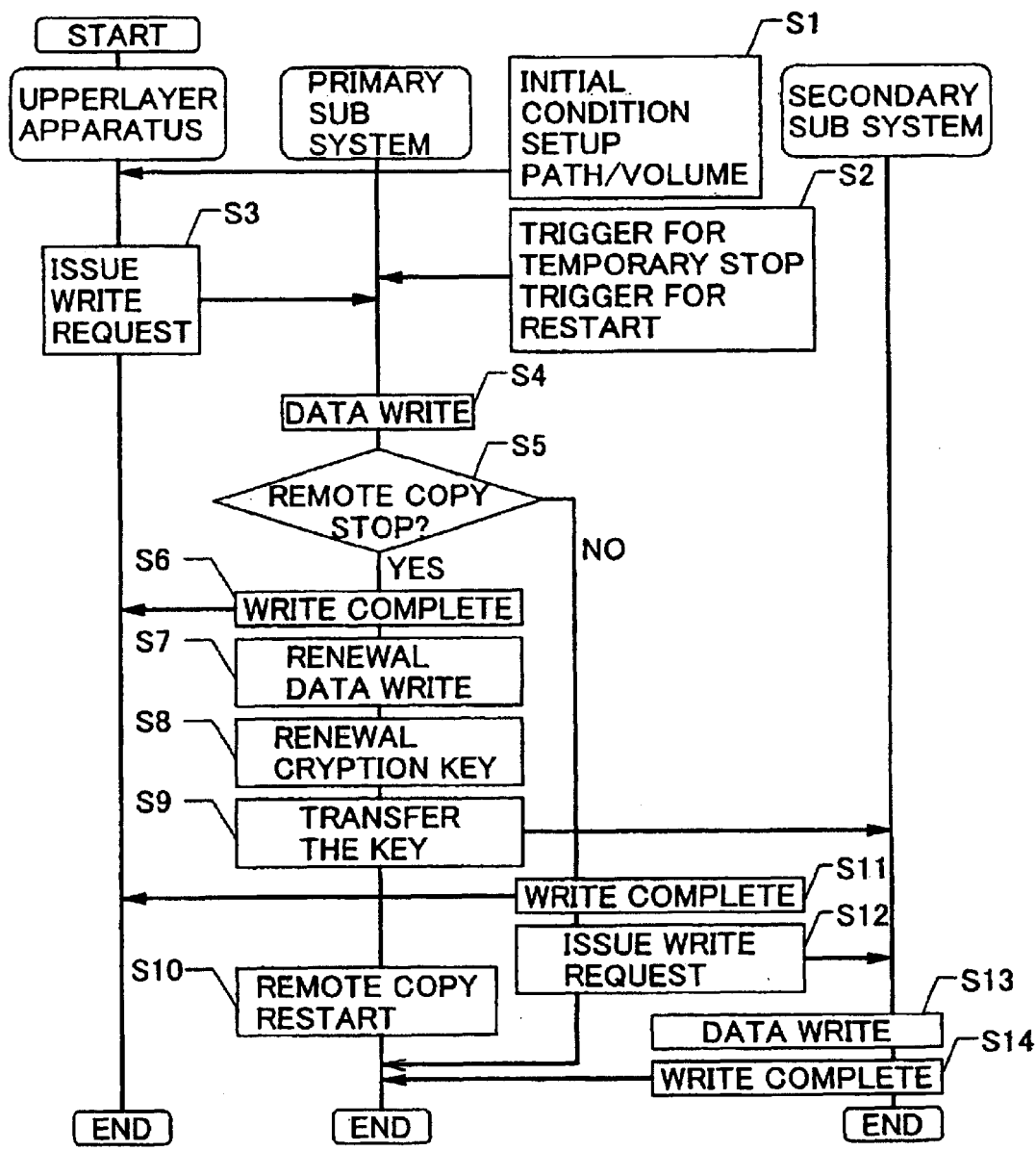
FIG. 17 is a flow chart showing the processing of the remote copy system.

The flow in FIG. 17 represents a case in which selection and setting are performed from a dedicated console. Initial settings of the path and volume pair for remote copying, that is, the setting as to which disk subsystem the request of remote copying is issued, is set in advance by a user to upper layer device 1 (step 1: shown as S1 in the drawing, the same below). Also, the initial settings of temporary stopping of remote copying and release of temporary stopping are set in the volume pair unit as the object of remote copying (step 2). Ordinarily, all volume pairs as an object of remote copying are defined as a single volume group, and the volumes within the volume group all are set to have the same status.

In the present example, all the volumes of disk subsystem 3 are treated as an object of remote copying. Accordingly, below, the state of remote copying is described in disk subsystem units rather than in volume pair or volume group units. As a method of setting files and volumes as object of remote copying, a method of specifying the specific addresses signifying the volumes and disk subsystems, or a method of selecting addresses from an arbitrary range of addresses by the control program within a disk subsystem, can also be adopted. An example of performing setting of the paths and volume pairs and setting of the opportunity for temporary stopping and the opportunity for release of temporary stopping as initial settings is shown.

When a write command is issued from upper layer device 1 to primary disk subsystem 3-1, 3-2, ..., 3-n (step 3), primary disk subsystem 3-1, 3-2, ..., 3-n performs processing of data storage to data buffer 22 within its own disk subsystem based on the write command (step 4). Here, a write command is a command that transfers an instruction to write data and the write data itself.

When a write command is received, primary disk subsystem 3-1, 3-2, ..., 3-n confirms whether or not primary disk subsystem group 3 is in a remote copy temporarily stopped state by acquiring and referencing the control bit representing the remote copy state being stored in remote copy control information storage component 27 of primary disk subsystem group 3 (step 5). When primary disk subsystem group 3 is in a remote copy temporarily stopped state and if writing of data to data buffer 22 is finished, primary disk subsystem 3-1, 3-2, ..., 3-n reports the completion of processing of the write command to upper layer device 1 (step 6). After this, a write command is issued to secondary disk subsystem 7-1, 7-2, ..., 7-n, and processing of the write command is completed.

In addition, when storage position information of data not transferred to the remote center is being held with respect to data that was previously updated at the main center, all the data at that position also is judged as an object of transfer to secondary disk subsystem 7-1, 7-2, ..., 7-n of remote center and a write command to write that data is issued to secondary disk subsystem 7-1, 7-2, ..., 7-n, and processing of the write command is completed. At this time, the data is encrypted using the presently set cryptographic key and is transferred from the primary disk subsystem to the secondary disk subsystem. That is, all the data by that write command and the updated data (write data) not transferred are encrypted using the present cryptographic key and all are transferred to the remote center (step 7). After that, the data transfer is placed in a temporarily stopped state.

Next, the cryptographic key within the main center (a cryptographic key is used for encrypting/decrypting data) is updated (step 8). After this, the updated cryptographic key is transferred to secondary disk subsystem 7-1, 7-2, ..., 7-n (step 9). After transferring the cryptographic key, primary disk subsystem 3-1, 3-2, ..., 3-n releases the remote copy (data transfer) temporarily stopped state of primary disk subsystem group 3 (step 10). Accordingly, following the temporarily stopped state of the remote copying, the updated new cryptographic key is used. That is, data transferred to the remote side is encrypted with the new cryptographic key (updated cryptographic key), and this encrypted data is transferred to the remote side.

In addition, in step 8 and step 9, the cryptographic key may be transferred to the remote side by creating data having the same data length/data pattern as data generally transferred from primary disk subsystem group 3 to secondary disk subsystem group 7 and embedding the cryptographic key as a part thereof. By doing this, there is no longer a need to use a special packet to transfer the cryptographic key, and because it is thought to be general data as seen from the outside, it becomes possible to conceal the timing of the temporary stopping of remote copying relative to the outside, and as a result the security when sending the cryptographic key is increased. Here it is important to make the data for embedding the cryptographic key resemble generally transferred data, and it is not necessary to make it always completely match.

Meanwhile, when primary disk subsystem group 3 is not in a remote copy temporarily stopped state in step 5 and if writing of data to data buffer 22 is finished, primary disk subsystem 3-1, 3-2, ..., 3-n reports the completion of processing of the write command to upper layer device 1 (step 11) and issues a write command to secondary disk subsystem 71, 7-2, ..., 7-n at an opportunity determined on the basis of the processing capability of its own subsystem. In regard to data updated (written) in the main center at this time, a write command may not immediately be issued to the remote center, but this is held within its own subsystem as storage position information of data not transferred to the remote center. Also, when storage position information of data not transferred to the remote center is being held with respect to data that was previously updated at the main center, the data at that position also is judged as an object of transfer to secondary disk subsystem 7-1, 7-2, ..., 7-n of the remote center, and a write command to write that data is issued. At this time, it is encrypted using the presently used cryptographic key and is transferred to the secondary side (step 12). That data storage position information is deleted after the transfer processing to the remote side with respect to the write command is completed.

That is, if primary disk subsystem group 3 is in a remote copy temporarily stopped state, primary disk subsystem group 3 of main center 9 updates the cryptographic key and transfers the updated cryptographic key to secondary disk subsystem group 7 of remote center 10. Moreover, if primary disk subsystem group 3 is not in a remote copy temporarily stopped state, remote copying is performed using the present cryptographic key, originating from that primary disk subsystem group 3 of main center 9 is issued a write command from upper layer device 1.

When secondary disk subsystem 7-1, 7-2, ..., 7-n confirms that a write command issued from primary disk subsystem 3-1, 3-2, ..., 3-n has been received, it performs processing of the write command, that is, data storage processing to data buffer 22 within its own subsystem (step 13).

When secondary disk subsystem 7-1, 7-2, ..., 7-n has completed processing of the write command, that is, data storage processing to data buffer 22 within its own subsystem, it makes a report of completion of processing of the write command to primary disk subsystem 3-1, 3-2, ..., 3-n (step 14).

By the present invention, data written from upper layer device 1 is not only stored in primary disk subsystem 3-1, 3-2, ..., 3-n, but it is copied and stored also to secondary disk subsystem 7-1, 7-2, 7-n. Moreover, the state of the data at primary disk subsystem 3-1, 3-2, ..., 3-n at the point when primary disk subsystem group 3 has gone into a remote copy temporarily stopped state is generated at secondary disk subsystem 7-1, 7-2, ..., 7-n on the remote center 10 side. At this time, primary disk subsystem group 3 transfers the updated cryptographic key to secondary disk subsystem group 7.

Secondary disk subsystem group 7, at the point when it has received a cryptographic key updated by primary disk subsystem group 3, can decrypt data using that updated cryptographic key. When main center 9 has been struck by a disaster, recovery operations, such as re-performing jobs, are performed using the data of secondary disk subsystem 7-1, 7-2, ..., 7-n, and tasks are restarted. These all are realized only with the functions of the disk subsystem, and they do not become a burden on the processing capability of the upper layer device.

Because the third preferred embodiment of the present invention as explained above comprises a system that updates the cryptographic key between the temporary stopping of remote copying set for each suitable time interval (the significance of temporary stopping of remote copying is the changing of the cryptographic key after this temporary stopping) and release of temporary stopping and notifies also the remote center of the updated cryptographic key, remote copy data restarted at the release of the temporary stopping is decrypted using the updated cryptographic key and the correspondence between the data transferred to the remote center and the cryptographic key becomes clear.

In the final analysis, the third preferred embodiment of the present invention has the following configurations, functions, or operations. The primary disk subsystem group of the main center and the secondary disk subsystem group of the remote center, being in mutually distant locations, are connected. When the primary disk subsystem group of the main center receives updated data from the upper layer device, it begins storage of the data to its own subsystem.

And, the primary disk subsystem group confirms whether or not its own subsystem is in the state of timing to change the cryptographic key. When it is not in the state of timing to change the cryptographic key, the primary disk subsystem group treats its data as an object of transfer to the remote center using the present cryptographic key. When it is in the state of timing to change the cryptographic key, after sending the presently received data and the unsent part of the data received up to now to the remote center, the primary disk subsystem group temporarily stops data transfer to the remote center, updates the cryptographic key, transfers the updated cryptographic key to the remote center and restarts the temporarily stopped data transfer to the remote center.

During said temporary stopping, data transfer to the remote center is not performed. After the temporarily stopped state of data transfer to the remote center is released in the primary disk subsystem group, the primary disk subsystem group of the main center restarts data transfer to the secondary disk subsystem group of the remote center using the updated cryptographic key. Doing thus, replication of data by remote copy is performed, updating the cryptographic key between the main center and the remote center.

Figure 19:
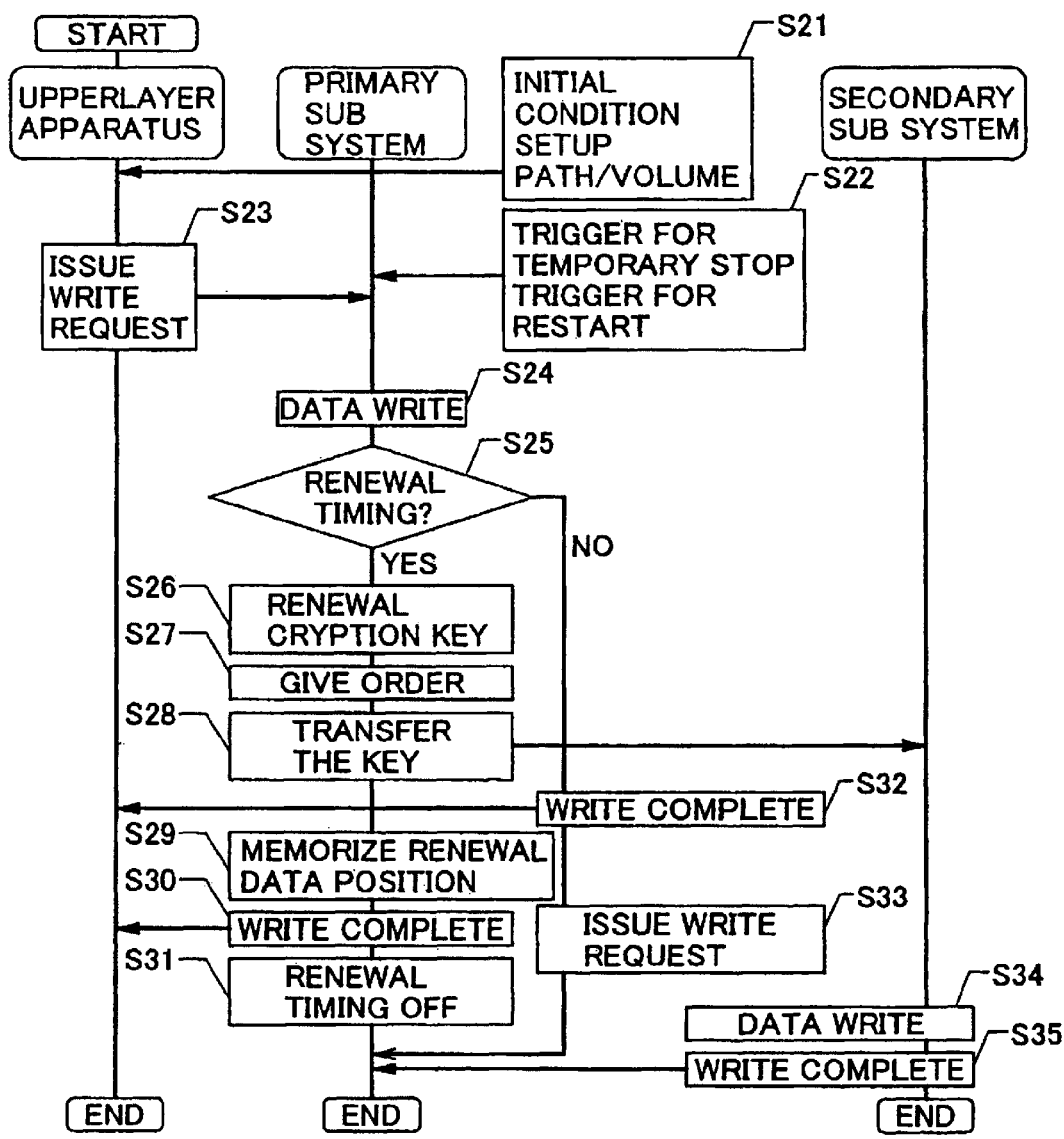
FIG. 19 is a flow chart showing the processing of the remote copy system.

Next, an outline of the data replication method and its operation will be explained with reference to FIG. 19 as the fourth preferred embodiment of the present invention. As for FIG. 19, steps 21–24 in the flow are common with steps 1–4 in the flow in FIG. 17. Here, the explanation is given from step 25.

In the event that a write command is received from upper layer device 1, primary disk subsystem 3-1, 3-2, ... 3-n confirms whether or not primary disk subsystem group 3 is in the state of timing to update the cryptographic key by acquiring and referencing the control-bit representing the state of remote copying stored in remote copy control information storage component 27 of primary disk subsystem group 3 (step 25). When primary disk subsystem group 3 is in the state of timing to update the cryptographic key, primary disk subsystem 3-1, 3-2, ..., 3-n updates the cryptographic key (step 26).

After this, in the same manner as data generally transferred from primary disk subsystem group 3 to secondary disk subsystem group 7, a sequence number (corresponds to the data sequence number) is assigned to the updated cryptographic key (step 27), this cryptographic key is transferred to secondary disk subsystem 7-1, 7-2, ..., 7-n (step 28), information indicating the update position of the data (for example, the address in the data buffer) is kept within the subsystem (step 29), and when writing is finished, the completion of processing of the write command is reported to upper layer device 1 (step 30). Furthermore, primary disk subsystem 3-1, 3-2, ..., 3-n releases the timing for updating the cryptographic key of primary disk subsystem group 3 (step 31).

The above operations will be explained in more detail. When write requests (write data) from the host are received, the primary disk subsystem stores them in the buffer while assigning sequence numbers to the data in the order in which the data was received. The data is encrypted at a suitable opportunity using the present cryptographic key (old cryptographic key), and the encrypted data is transferred together with the sequence numbers to the secondary disk subsystem. At this time, the order of the data transferred to the secondary disk subsystem need not always be the order in which the data is received from the host. The reason for this is because the data can be re-sorted in an order based on sequence numbers assigned to the data in the secondary disk subsystem.

In the meantime, when it becomes time to update the cryptographic key, the primary disk subsystem updates the cryptographic key (new cryptographic key) of its own system, and moreover it adopts a sequence number assigned to write data from the host and transmits the updated cryptographic key together with this sequence number to the secondary disk subsystem. Specifically, if the sequence numbers (1), (2), and (3) have been assigned to the data up to now, the sequence number (4) is assigned to the updated cryptographic key at the time of updating of the cryptographic key.

And, the updated cryptographic key (new cryptographic key) and the sequence number (4) are transferred as a pair to the secondary disk subsystem. The secondary disk subsystem having received this, then uses the cryptographic key updated with the sequence number (4) on received data. From another viewpoint, the secondary disk subsystem decrypts data using the cryptographic key before the update on data having sequence numbers of (3) or lower, and decrypts data using the updated cryptographic key on those having sequence numbers of (5) or higher.

After that, when the primary disk subsystem receives new write requests, because the sequence number (4) already has been used to send the cryptographic key, the sequence number (5) is assigned to this write request data, and the data is stored in the buffer. After that, the data is encrypted using the updated cryptographic key at a suitable opportunity, and it is transferred to the secondary disk subsystem together with the sequence number (5).

When the secondary disk subsystem receives actual data, it organizes the received data according to the sequence numbers. And, the secondary disk subsystem, which has learned that the cryptographic key has been updated at sequence number (4), performs decryption according to need, associating the old cryptographic key with data having the sequence numbers (1), (2) and (3), and associating the new cryptographic key with data having the sequence number (5).

Also, when it is not time for primary disk subsystem group 3 to update the cryptographic key, when writing is finished, primary disk-subsystem 3-1, 3-2, . . . , 3-n reports completion of processing of the write command to upper layer device 1 (step 32), and issues a write command to secondary disk subsystem 7-1, 7-2, . . . , 7-n at an opportunity determined on the basis of the processing capability of its own subsystem. And, it encrypts the data with the present cryptographic key and transfers it to the remote center.

In regard to data updated in the main center at this time, a write command may not immediately be issued to the remote center, but this is held within its own subsystem together with storage position information of data not transferred to the remote center. Also, when storage position information of data not transferred to the remote center is being held with respect to data that was previously updated at the main center, the data at that position also is judged as an object of transfer to secondary disk subsystem 7-1, 7-2, . . . , 7-n of the remote center, and a write command to write that data is issued (step 33). And, that data is encrypted using the present cryptographic key and is transferred to the remote center. That data storage position information is deleted after the processing of the write command is completed.

That is, if it is time for primary disk subsystem group 3 to update the cryptographic key, primary disk subsystem group 3 of main center 9 transfers the updated cryptographic key to secondary disk subsystem group 7 of remote center 10. Also, if it is not time for primary disk subsystem group 3 to update the cryptographic key, remote copying is performed, originating from that primary disk subsystem group 3 of main center 9 is issued a write command from upper layer device 1.

When secondary disk subsystem 7-1, 7-2, . . . , 7-n confirms that a write command issued from primary disk subsystem 3-1, 3-2, . . . , 3-n has been received, it performs processing of the write command, that is, data storage processing to data buffer 22 within its own subsystem (step 34).

When secondary disk subsystem 7-1, 7-2, . . . , 7-n has completed processing of the write command, that is, data storage processing to data buffer 22 within its own subsystem, it makes a report of completion of processing of the write command to primary disk subsystem 3-1, 3-2, . . . , 3-n (step 35).

By the present invention, data written from upper layer device 1 is not only stored in primary disk subsystem 3-1, 3-2, . . . , 3-n, but it is copied and stored also to secondary disk subsystem 7-1, 7-2, 7-n. Also, at the point when it is time for primary disk subsystem group 3 to update the cryptographic key, a sequence number is assigned to the updated cryptographic key by primary disk subsystem group 3 and it is transferred to secondary disk subsystem group 7.

Secondary disk subsystem group 7 can decrypt by specifying the data to which the updated cryptographic key is applied using data generally transferred by primary disk subsystem group 3 and the sequence number assigned to the updated cryptographic key. When main center 9 has been struck by a disaster, recovery operations, such as re-performing jobs using the data of secondary disk subsystem 7-1, 7-2, . . . , 7-n, are performed and tasks are restarted. These all are realized only with the functions of the disk subsystem, and they do not become a burden on the processing capability of the upper layer device.

Figure 20:
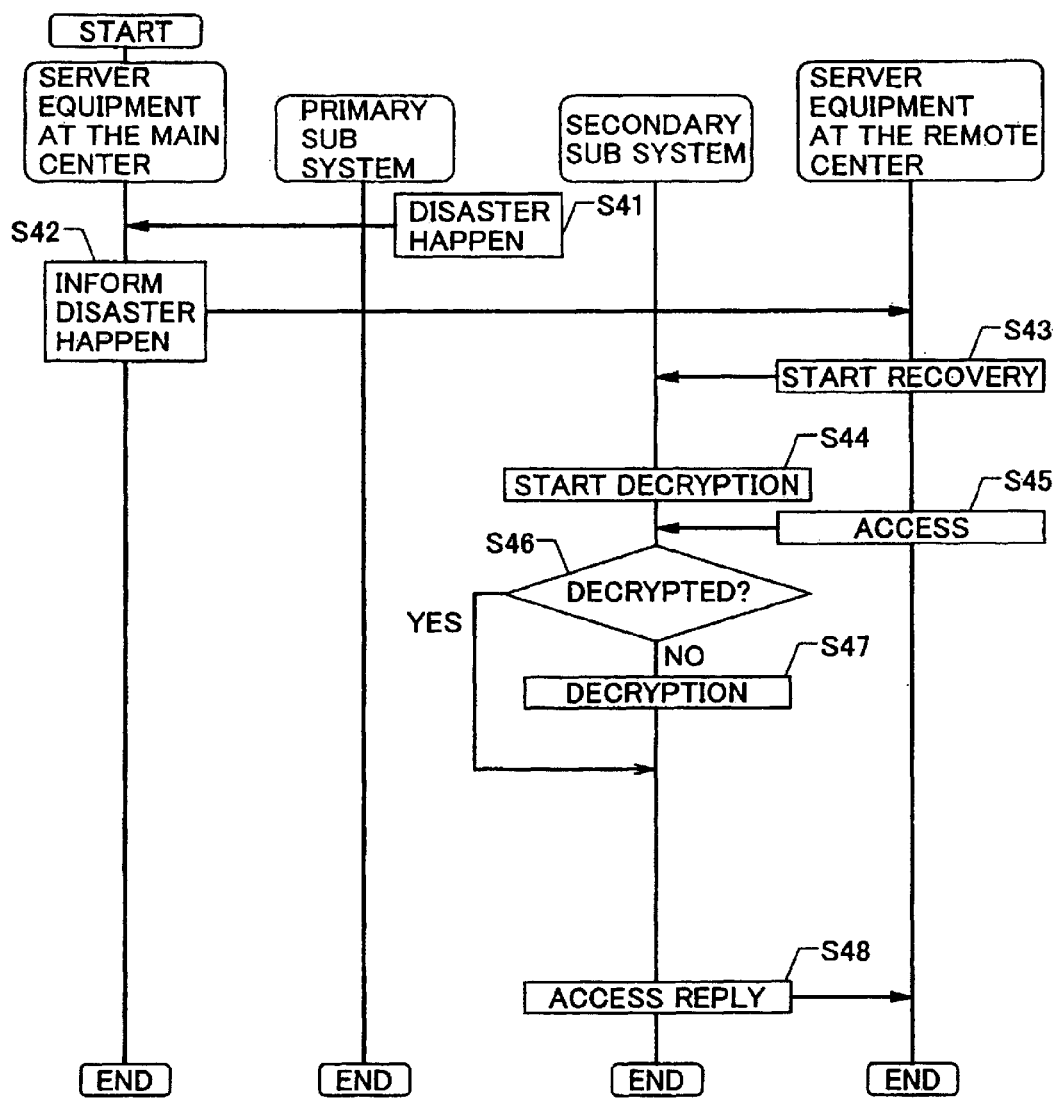
FIG. 20 is a flow chart showing the processing of the remote copy system.

Next, an outline of the method of data replication and its operation will be explained with reference to FIG. 20 as the fifth preferred embodiment of the present invention. Here, it is assumed that the secondary disk subsystem stores, as is, encrypted data received from the primary disk subsystem.

The operation when a disaster has occurred (step 41) at main center 9 during performing of remote copy is shown. Main center notifies remote center 10 that a disaster has occurred (step 42). In response to this, remote center 10 begins disaster recovery, such as system startup (step 43). Decryption of data stored without decryption in secondary disk subsystem group 7 of remote center 10 is started in order to put it to use (step 44). At this time, when the cryptographic key is stored in secondary disk subsystem group 7, decryption is performed using that cryptographic key. The cryptographic key can also be stored in a storage device in a separate location outside remote center 10. In this case, that cryptographic key is transferred to secondary disk subsystem group 7 of remote center 10, and decryption is performed using this.

When data of secondary disk subsystem group 7 is accessed from upper layer device 8 of remote center 10 (step 45), secondary disk subsystem group 7 examines as to whether or not the accessed data has been already decrypted (step 46). When the accessed data has not been yet decrypted, secondary disk subsystem group 7 performs decryption with respect to that data (step 47) and responds to the access using the decrypted data (step 48). When the accessed data has been already decrypted, secondary disk subsystem group 7 responds to the access using that data (step 48). These all are realized only with the functions of the disk subsystem, and they do not become a burden on the processing capability of the upper layer device. Thus, when a disaster has occurred in the main center, the copied data in the remote center does not depend on the main center and all the copied data or appropriately accessed copied data is decrypted to be used by the disk subsystem of the remote center in place of the main center.

Figure 21:
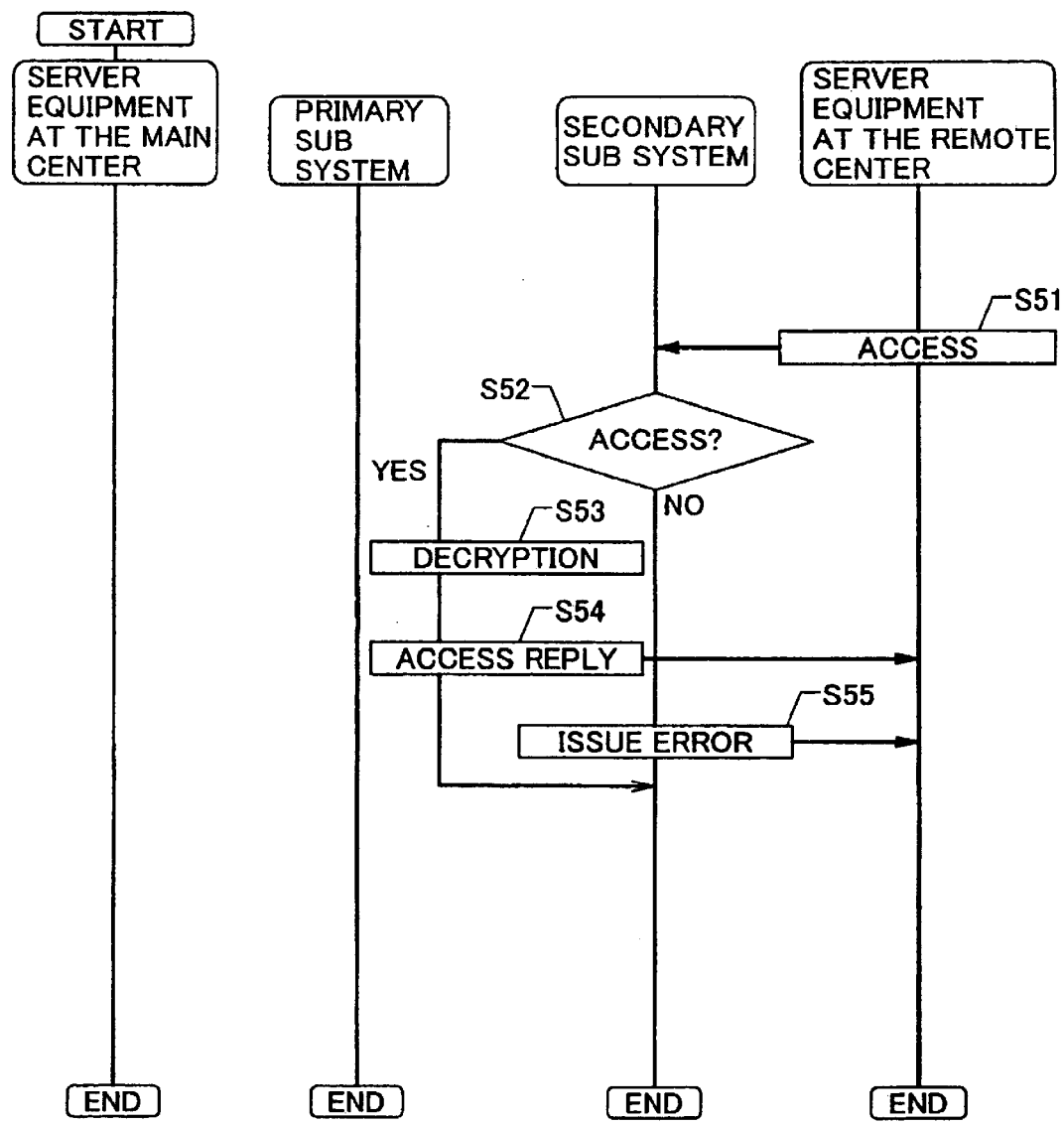
FIG. 21 is a flow chart showing the processing of the remote copy system.

Next, an outline of the data replication method and its operation will be explained with reference to FIG. 21 as the sixth preferred embodiment of the present invention.

This is the operation when secondary disk subsystem group 7 is accessed from remote center 10 (step 51) in order to use the data stored in secondary disk subsystem group 7 of remote center 10 which was remote copied and not decrypted. Access to data generally involves searching an ID field or key field related to the data and reading/writing the subsequent data when the search condition was satisfied.

At this time, it is examined whether or not the search condition on the specific field, for example the key field, is satisfied (step 52). When this condition is satisfied, the subsequent data is decrypted (step 53), and it is read/written (step 54). When this condition is not satisfied, an error report is given without the subsequent data being decrypted (step 55). These operations all are realized only using the functions of the disk subsystem, and they do not become a burden on the processing capability of the upper layer device.

According to the present invention, processing of data decryption, which takes a long time, can be performed asynchronously on the system which receives encrypted data, and it becomes possible to simultaneously receive a large quantity of encrypted data.

It is possible to realize an encryption system with a remote copy facility that can assure consistency of updated data within the scope expected by the user, and can reduce the risk of leaking of information by updating the cryptographic key, just by a functional change of the subsystem side without requiring the introduction of new software to the upper layer device.

What is claimed is:

1. A computer system comprising:
   a first storage system;
   a second storage system which connected to said first storage system via a first communication channel; and
   a computer which connected to said second storage system via a second communication channel,
   wherein said first storage system sends encrypted data to said second storage system via the first communication channel,
   wherein said second storage system receives said encrypted data from said first storage system, and stores said encrypted data without decrypting,
   wherein said computer reads out said encrypted data from said second storage system via said second communication channel based on a particular timing, decrypts said encrypted data, and sends back decrypted data to said second storage system, and
   wherein said second storage system receives said decrypted data from said computer and stores said decrypted data.

2. A computer system according to claim 1, wherein said particular timing is a predetermined scheduled cyclic time.

3. A computer system according to claim 1, wherein said particular timing is when said computer receives a request from said second storage system via said second communication channel.

4. A computer system according to claim 1, wherein said second storage system stores said decrypted data into a place where said encrypted data were stored.

5. A computer system according to claim 1, wherein said second storage system has a memory, and said second storage system stores information, which includes address of place in where said encrypted data are stored, in said memory when said second storage system stores said encrypted data.

6. A computer system according to claim 5, wherein said computer reads said information from said second storage system and, reads out said encrypted data and sends said decrypted data based on said address included in said information.

7. A computer system according to claim 5, wherein said particular timing is when said computer receives a request from said second storage system via said second communication channel,
   wherein said second storage system sends said request when said memory is short of storing said information.

8. A computer system according to claim 3, wherein said first storage system sends a key for decryption to said second storage system,
   wherein said computer reads said key for decryption from said second storage system and decrypts said encrypted data by using said key for decryption.

9. A computer system comprising:
   a first storage system; and
   a second storage system which connected to said first storage system via a communication channel,
   wherein said first storage system sends encrypted data to said second storage system via the communication channel;
   wherein said second storage system receives said encrypted data from said first storage system, and stores said encrypted data without decrypting,
   wherein said second storage system decrypts said encrypted data based on a particular timing and stores said decrypted data.

10. A computer system according to claim 9, wherein said particular timing is a predetermined scheduled cyclic time.

11. A computer system according to claim 10, wherein said second storage system stores said decrypted data into a place where said encrypted data were stored.

12. A computer system according to claim 11, wherein said second storage system has a memory, and said second storage system stores information, which includes address of place in where said encrypted data are stored, in said memory when said second storage system stores said encrypted data.

13. A computer system according to claim 12, wherein said second storage system reads said encrypted data and stores said decrypted data based on said address included in said information.

14. A computer system according to claim 13, wherein said particular timing is when said memory is short of storing said information.

15. A computer system according to claim 14, wherein said first storage system sends a key for decryption to said second storage system,
   wherein said second storage system decrypts said encrypted data by using said key for decryption.

* * * * *